(12) United States Patent
Xu et al.

(10) Patent No.: US 11,074,276 B2
(45) Date of Patent: Jul. 27, 2021

(54) METHODS AND SYSTEMS FOR OPTIMIZED VISUAL SUMMARIZATION FOR SEQUENCES OF TEMPORAL EVENT DATA

(71) Applicant: Robert Bosch GmbH, Stuttgart (DE)

(72) Inventors: Panpan Xu, Sunnyvale, CA (US); Liu Ren, Cupertino, CA (US); Yuanzhe Chen, Sai Kung District (HK)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 16/047,092

(22) Filed: Jul. 27, 2018

(65) Prior Publication Data
US 2019/0034519 A1    Jan. 31, 2019

Related U.S. Application Data
(60) Provisional application No. 62/537,621, filed on Jul. 27, 2017.

(51) Int. Cl.
| | | |
|---|---|---|
| G06F 15/16 | (2006.01) | |
| G06F 16/28 | (2019.01) | |
| G06F 9/54 | (2006.01) | |
| G06F 16/26 | (2019.01) | |
| G06F 16/901 | (2019.01) | |

(Continued)

(52) U.S. Cl.
CPC ............ *G06F 16/287* (2019.01); *G06F 9/542* (2013.01); *G06F 16/248* (2019.01); *G06F 16/2477* (2019.01); *G06F 16/26* (2019.01); *G06F 16/9024* (2019.01)

(58) Field of Classification Search
None
See application file for complete search history.

(56) References Cited

U.S. PATENT DOCUMENTS

2005/0240544 A1* 10/2005 Kil .......................... G06F 19/00
                                                          706/45
2010/0107254 A1* 4/2010 Eiland ................. H04L 63/1416
                                                          726/23

(Continued)

OTHER PUBLICATIONS

International Search Report and Written Opinion corresponding to International Patent Application No. PCT/US2018/044035 (13 pages).

(Continued)

*Primary Examiner* — Alex Gofman
(74) *Attorney, Agent, or Firm* — Maginot, Moore & Beck LLP

(57) ABSTRACT

A method for generating a graphical depiction of summarized event sequences includes receiving a plurality of event sequences, each event sequence in the plurality of event sequences including a plurality of events, and generating a plurality of clusters using a minimum description length (MDL) optimization process. Each cluster in the plurality of clusters including a set of at least two event sequences in the plurality of event sequences that maps to a pattern in each cluster. The pattern in each cluster further includes a plurality of events included in at least one event sequence in the set of at least two event sequences in the cluster. The method includes generating a graphical depiction of a first cluster in the plurality of clusters, the graphical depiction including a graphical depiction of a first plurality of events in the pattern of the first cluster.

18 Claims, 14 Drawing Sheets

(51) Int. Cl.
G06F 16/2458 (2019.01)
G06F 16/248 (2019.01)

(56) References Cited

U.S. PATENT DOCUMENTS

| | | | |
|---|---|---|---|
| 2011/0227925 | A1 | 9/2011 | De Pauw et al. |
| 2014/0074850 | A1* | 3/2014 | Noel ................. G06F 11/0709 707/741 |
| 2015/0154263 | A1* | 6/2015 | Boddhu ............ G06F 16/2465 707/737 |
| 2016/0086185 | A1* | 3/2016 | Adjaoute ........... G06Q 20/4016 705/44 |
| 2016/0224835 | A1 | 8/2016 | Newman et al. |
| 2016/0359872 | A1* | 12/2016 | Yadav ..................... H04L 43/04 |
| 2017/0118093 | A1 | 4/2017 | Dontcheva et al. |
| 2017/0132291 | A1* | 5/2017 | Liu .................... G06F 16/2465 |

OTHER PUBLICATIONS

Tatti, N. et al., "The Long and Short of It: Summarising Event Sequences with Serial Episodes," KDD'12, 2012 (10 pages).

Maguire, E. et al., "Visual Compression of Workflow Visualizations with Automated Detection of Macro Motifs," IEEE Transactions on Visualization and Computer Graphics , vol. 19, No. 12, 2013 (10 pages).

Google analytics, retrieved from https://analytics.google.com/, Oct. 22, 2018 (7 pages).

E. Brill and R. C. Moore, "An improved error model for noisy channel spelling correction," In Proceedings of the 38th Annual Meeting on Association for Computational Linguistics, pp. 286-293, Association for Computational Linguistics, 2000 (8 pages).

I. Cadez, D. Heckerman, C. Meek, P. Smyth, and S. White, "Model-based clustering and visualization of navigation patterns on a web site," Data Mining and Knowledge Discovery, 7(4):399-424, 2003 (29 pages).

V. Cao, Y.-R. Lin, F. Du, and D. Wang, "Episogram: Visual summarization of egocentric social interactions," IEEE computer graphics and applications, 36(5):72-81, 2016 (9 pages).

J. Chuang, D. Ramage, C. Manning, and J. Heer, "Interpretation and trust: Designing model-driven visualizations for text analysis," In Proceedings of the SIGCHI Conference on Human Factors in Computing Systems, CHI'12, pp. 443-452. ACM, New York, NY, USA, 2012 (10 pages).

F. Du, C. Plaisant, N. Spring, and B. Shneiderman, "Eventaction: Visual analytics for temporal event sequence recommendation," Proceedings of the IEEE Visual Analytics Science and Technology, 2016 (10 pages).

F. Du, B. Shneiderman, C. Plaisant, S. Malik, and A. Perer, "Coping with volume and variety in temporal event sequences: Strategies for sharpening analytic focus," IEEE Transactions on Visualization and Computer Graphics, pp. (99):1-14, 2016 (14 pages).

J. A. Ferstay, C. B. Nielsen, and T. Munzner, "Variant view: Visualizing sequence variants in their gene context," IEEE transactions on visualization and computer graphics, 19(12):2546-2555, 2013 (10 pages).

D. Fisher, "Agavue event data sample: Full datase," version of Oct. 20,2016, Microsoft research. Retrieved from http://eventevent.github.io (8 pages).

D. Gotz, "Soft patterns: Moving beyond explicit sequential patterns during visual analysis of longitudinal event datasets," In Proceedings of the IEEE VIS 2016 Workshop on Temporal & Sequential Event Analysis, 2016 (2 pages).

D. Gotz and H. Stavropoulos, "Decisionflow: Visual analytics for high dimensional temporal event sequence data," IEEE transactions on visualization and computer graphics, 20(12):1783-1792, 2014 (10 pages).

P. Grunwald, "A tutorial introduction to the minimum description length principle," arXiv preprint math/0406077, 2004 (80 pages).

P. D. Grunwald, "The minimum description length principle," MIT press, 2007 (Preface, 8 pages).

S. Ioffe, "Improved consistent sampling, weighted minhash and L1 sketching," In Data Mining (ICDM), 2010 IEEE 10th International Conference on, pp. 246-255. IEEE, 2010 (10 pages).

H. Koga, T. Ishibashi, and T. Watanabe, "Fast agglomerative hierarchical clustering algorithm using locality-sensitive hashing," Knowledge and Information Systems, 12(1):25-53, 2007 (2 pages).

J. Krause, A. Perer, and H. Stavropoulos, "Supporting iterative cohort construction with visual temporal queries," IEEE transactions on visualization and computer graphics, 22(1):91-100, 2016 (10 pages).

M. Krstajic, E. Bertini, and D. Keim. Cloudlines, "Compact display of event episodes in multiple time-series," IEEE Transactions on Visualization and Computer Graphics, 17(12):2432-2439, Dec. 2011 (8 pages).

B. C. Kwon, J. Verma, and A. Perer, "Peekquence: Visual analytics for event sequence data," In ACM SIGKDD 2016 Workshop on Interactive Data Exploration and Analytics, 2016 (4 pages).

J. Leskovec, A. Rajaraman, and J. D. Ullman, "Mining of massive datasets," Cambridge University Press, 2014 (513 pages).

Z. Liu, H. Dev, M. Dontcheva, and M. Hoffman, "Mining, pruning and visualizing frequent patterns for temporal event sequence analysis," In Proceedings of the IEEE VIS 2016 Workshop on Temporal & Sequential Event Analysis, 2016 (3 pages).

Z. Liu, Y. Wang, M. Dontcheva, M. Hoffman, S. Walker, and A. Wilson, "Patterns and sequences: Interactive exploration of clickstreams to understand common visitor paths," IEEE Transactions on Visualization and Computer Graphics, 23(1):321-330, 2017 (10 pages).

A. Makanju, S. Brooks, A. N. Zincir-Heywood, and E. E. Milios, "Logview: Visualizing event log clusters," In Privacy, Security and Trust, 2008, PST'08. Sixth Annual Conference on, pp. 99-108, IEEE, 2008 (10 pages).

M. Monroe, R. Lan, H. Lee, C. Plaisant, and B. Shneiderman, "Temporal event sequence simplification," IEEE transactions on visualization and computer graphics, 19(12):2227-2236, 2013 (10 pages).

A. Perer and D. Gotz, "Data-driven exploration of care plans for patients," In CHI'13 Extended Abstracts on Human Factors in Computing Systems, pp. 439-444, ACM, 2013 (6 pages).

A. Perer and F. Wang, "Frequence: interactive mining and visualization of temporal frequent event sequences," In Proceedings of the 19th international conference on Intelligent User Interfaces, pp. 153-162, ACM, 2014 (10 pages).

C. Plaisant, B. Milash, A. Rose, S. Widoff, and B. Shneiderman, "Lifelines: visualizing personal histories," In Proceedings of the SIGCHI conference on Human factors in computing systems, pp. 221-227, ACM, 1996 (7 pages).

C. Plaisant and B. Shneiderman, "The diversity of data and tasks in event analytics," In Proceedings of the IEEE VIS 2016 Workshop on Temporal & Sequential Event Analysis, 2016 (4 pages).

P. J. Polack, S.-T. Chen, M. Kahng, M. Sharmin, and D. H. Chau, "Timestitch: Interactive multi-focus cohort discovery and comparison," In Visual Analytics Science and Technology (VAST), 2015 IEEE Conference on, pp. 209-210, IEEE, 2015 (2 pages).

R. A. Ruddle, J. Bernard, T. May, H. Lucke-Tieke, and J. Kohlhammer, "Methods and a research agenda for the evaluation of event sequence visualization techniques," In Proceedings of the IEEE VIS 2016 Workshop on Temporal & Sequential Event Analysis. Leeds, 2016 (4 pages).

D. Salomon and G. Motta, "Handbook of data compression," Springer Science & Business Media, 2010 (Table of Contents, 7 pages).

J. M. Santos and M. Embrechts, "On the use of the adjusted rand index as a metric for evaluating supervised classification," In International Conference on Artificial Neural Networks, pp. 175-184, Springer, 2009 (10 pages).

Z. Shen and N. Sundaresan, "Trail explorer: Understanding user experience in webpage flows," IEEE VisWeek Discovery Exhibition, pp. 7-8, 2010 (3 pages).

(56) References Cited

OTHER PUBLICATIONS

Z. Shen, J. Wei, N. Sundaresan, and K.-L. Ma, "Visual analysis of massive web session data," In Large Data Analysis and Visualization (LDAV), 2012 IEEE Symposium on, pp. 65-72, IEEE, 2012 (8 pages).

B. Shneiderman, "The eyes have it: A task by data type taxonomy for information visualizations," In Visual Languages, 1996, Proceedings, IEEE Symposium on, pp. 336-343, IEEE, 1996 (8 pages).

J. Stasko and E. Zhang, "Focus-F context display and navigation techniques for enhancing radial, space-filling hierarchy visualizations," In Information Visualization, 2000, InfoVis 2000, IEEE Symposium on, pp. 57-65, IEEE, 2000 (9 pages).

R. Veras and C. Collins, "Optimizing hierarchical visualizations with the minimum description length principle," IEEE Transactions on Visualization and Computer Graphics, 23(1):631-640, Jan. 2017 (10 pages).

K. Vrotsou, J. Johansson, and M. Cooper, "Activitree: interactive visual exploration of sequences in event-based data using graph similarity," IEEE Transactions on Visualization and Computer Graphics, 15(6):945-952, 2009 (15 pages).

G. Wang, X. Zhang, S. Tang, H. Zheng, and B. Y. Zhao, "Unsupervised clickstream clustering for user behavior analysis," In Proceedings of the 2016 CHI Conference on Human Factors in Computing Systems, pp. 225-236, ACM, 2016 (12 pages).

T. D.Wang, C. Plaisant, A. J. Quinn, R. Stanchak, S. Murphy, and B. Shneiderman, "Aligning temporal data by sentinel events: discovering patterns in electronic health records," In Proceedings of the SIGCHI conference on Human factors in computing systems, pp. 457-466, ACM, 2008 (10 pages).

T. D.Wang, C. Plaisant, B. Shneiderman, N. Spring, D. Roseman, G. Marchand, V. Mukherjee, and M. Smith, "Temporal summaries: Supporting temporal categorical searching, aggregation and comparison," IEEE transactions on visualization and computer graphics, 15(6), 2009 (8 pages).

J. Wei, Z. Shen, N. Sundaresan, and K.-L. Ma, "Visual cluster exploration of web clickstream data," In Visual Analytics Science and Technology (VAST), 2012 IEEE Conference on, pp. 3-12, IEEE, 2012 (10 pages).

K. Wongsuphasawat and D. Gotz, "Exploring flow, factors, and outcomes of temporal event sequences with the butflow visualization," IEEE Transactions on Visualization and Computer Graphics, 18(12):2659-2668, Dec. 2012 (10 pages).

K. Wongsuphasawat, J. A. Guerra G'omez, C. Plaisant, T. D. Wang, M. Taieb-Maimon, and B. Shneiderman, "Lifeflow: visualizing an overview of event sequences," In Proceedings of the SIGCHI conference on human factors in computing systems, pp. 1747-1756, ACM, 2011 (10 pages).

K. Wongsuphasawat and B. Shneiderman, "Finding comparable temporal categorical records: A similarity measure with an interactive visualization," In Visual Analytics Science and Technology, 2009, VAST 2009, IEEE Symposium on, pp. 27-34, IEEE, 2009 (8 pages).

E. Zgraggen, S. M. Drucker, D. Fisher, and R. Deline, "(sjqu)eries: Visual regular expressions for querying and exploring event sequences," In Proceedings of the 33rd Annual ACM Conference on Human Factors in Computing Systems, CHI 2015, Seoul, Republic of Korea, Apr. 18-23, 2015, pp. 2683-2692, 2015 (10 pages).

J. Zhao, C. Collins, F. Chevalier, and R. Balakrishnan, "Interactive exploration of implicit and explicit relations in faceted datasets," IEEE Transactions on Visualization and Computer Graphics, 19(12):2080-2089, 2013 (11 pages).

J. Zhao, Z. Liu, M. Dontcheva, A. Hertzmann, and A.Wilson, "Matrixwave: Visual comparison of event sequence data," In Proceedings of the 33rd Annual ACM Conference on Human Factors in Computing Systems, pp. 259-268, ACM, 2015 (10 pages).

* cited by examiner

1200

Input: sequences $S = \{S_1, S_2, ..., S_n\}$
Output: pattern and cluster tuples
$\mathcal{C} = \{(P_1, G_1), (P_2, G_2), ..., (P_k, G_k)\}$
/* Initialization phase
1    $\mathcal{C} = \{(P, G) | P = S, G = \{S\} \text{ for all } S \in \mathcal{S}\}$;
2    PriorityQueue $Q = \emptyset$;
3    for *all pairs* $c_i, c_j \in \mathcal{C}$ *and* $i \neq j$ do
4        $\Delta L, c^* = Merge(c_i, c_j)$;
5        if $\Delta L > 0$ then
6            insert $(\Delta L, c^*, c_i, c_j)$ into $Q$;
7        end
8    end
/* Iterative merging phase
9    while $Q \neq \emptyset$ do
10       retrieve $(\Delta L, c^*, c_i, c_j)$ from $Q$ with the largest $\Delta L$;
11       $c_{new} = c^*$;
12       remove $c_i, c_j$ from $\mathcal{C}$, add $c_{new}$ to $\mathcal{C}$;
13       remove all pairs containing $c_i$ or $c_j$ from $Q$;
14       for $c \in \mathcal{C} - c_{new}$ do
15           $\Delta L, c^* = Merge(c, c_{new})$;
16           if $\Delta L > 0$ then
17               insert $(\Delta L, c^*, c, c_{new})$ into $Q$;
18           end
19       end
20   end
21   return $\mathcal{C}$

Algorithm 1: MinDL

Input: $S = \{S_1, S_2, ..., S_n\}, th_{start}, th_{end}, th_{rate}$
Output: $\mathcal{C} = \{(P_1, G_1), (P_2, G_2), ..., (P_k, G_k)\}$ 1. $\mathcal{C} = \{(S_1, \{S_1\}), (S_2, \{S_2\}), ..., (S_n, \{S_n\})\};$
2. PriorityQueue $Q = \emptyset;$
3. $th = th_{start};$
4. while $th > th_{end}$ do
5.     /* LSH table initialization with threshold $th$
6.     lshInit($th$);
7.     for $c_i$ in $\mathcal{C}$ do
8.         lshInsert($c_i$)
9.     end

/* MinDL: initialization phase
9.     for $c_i \in \mathcal{C}$ do
10.         for $c_j \in lshQuery(c_i)$ do
11.             $\Delta L, c^* = Merge(c_i, c_j);$
12.             if $\Delta L > 0$ then
13.                 push $(\Delta L, c^*, c_i, c_j)$ to $Q$;
14.             end
15.         end
16.     end

/* MinDL: iterative merging phase
17.     while $Q \neq \emptyset$ do
18.         pop $(\Delta L, c^*, c_i, c_j)$ from $Q$;
19.         remove $c_i, c_j$ from $\mathcal{C}$, add $c^*$ to $\mathcal{C}$;
20.         $c_{new} = c^*;$ /* LSH table update
21.         lshDelete($c_i$), lshDelete($c_j$);
22.         lshInsert($c^*$);
23.         for $c \in lshQuery(c_{new})$ do
24.             $\Delta L, c^* = Merge(c, c_{new});$
25.             if $\Delta L > 0$ then
26.                 push $(\Delta L, c^*, c, c_{new})$ to $Q$;
27.             end
28.         end
29.     end
30.     $th = th \times th_{rate};$
31. end
32. return $\mathcal{C}$

Algorithm 1A: MinDL+LSH

Input: $c_i = (P_i, G_i), c_j = (P_j, G_j)$
Output: cost reduction $\Delta L$ and $c^* = (P^*, G_i \cup G_j)$ by merging $c_i$ and $c_j$ /* Initialization phase                                          */
1  init pattern $P^* = P = LCS(P_i, P_j)$;
2  candidate events $E_c = P_i - P \cup P_j - P$;
3  sort $E_c$ by frequency in desc order;
4  $\Delta L = -1$;
   /* Pattern buildup phase                                       */
5  for $e$ *in* $E_c$ do
6      $P = Add(P, e)$;
7      $\Delta L' = len(P_i) + len(P_j) - len(P) + \alpha \sum_{S \in G_i} edits(S, P_i) + \alpha \sum_{S \in G_j} edits(S, P_j) - \alpha \sum_{S \in G_i \cup G_j} edits(S, P) + \lambda$;
8      if $\Delta L' < 0$ *or* $\Delta L' < \Delta L$ then
9         break;
10     else
11        $\Delta L = \Delta L'$;
12        $P^* = P$;
13     end
14 end
15 return $\Delta L, c^* = (P^*, G_i \cup G_j)$

Algorithm 2: Merge

FIG. 14

METHODS AND SYSTEMS FOR OPTIMIZED VISUAL SUMMARIZATION FOR SEQUENCES OF TEMPORAL EVENT DATA

CLAIM OF PRIORITY

This application claims the benefit of U.S. Provisional Application No. 62/537,621, which is entitled "Sequence Synopsis: Optimize Visual Summary of Temporal Event Data," and was filed on Jul. 27, 2017, the entire contents of which are hereby incorporated herein by reference.

FIELD

This disclosure relates generally to the field of computer graphics and, more specifically, to systems and methods for generating summarized graphical displays of sequences of data.

BACKGROUND

Unless otherwise indicated herein, the materials described in this section are not prior art to the claims in this application and are not admitted to the prior art by inclusion in this section.

Event sequence data, i.e., multiple series of timestamped or ordered events, is increasingly common in a wide range of domains. Website click streams, user interaction logs in software applications, electronic health records (EHRs) in medical care and vehicle error logs in automotive industry can all be modeled as event sequences. It is crucial to reason about and derive insights from such data for effective decision making in these domains. For example, by analyzing vehicle error logs, typical fault development paths can be identified, which can inform better strategies to prevent the faults from occurring or alert drivers in advance, and therefore improve driver experience and reduce warranty cost. Similarly, by analyzing users' interaction log with software applications, usability issues and user behavior patterns can be identified to inform better designs of the interface.

Modern computing systems are capable of generating graphical displays of large sets of event sequences including, for example, sets that contain hundreds, thousands, and millions of event sequences. However, while modern computing hardware can produce graphical depictions of extremely large sets of event sequences, the display of so much complex information often overwhelms a human user, which results in the data being less useful for analysis. The display of large sets of event sequences for rea-world data often produces a visual "clutter" due to the noisy and complex nature of the event sequences with high event cardinality, which presents challenges to constructing concise yet comprehensive overviews for such data. Consequently, improvements to methods and systems that generate graphical depictions of event sequences that improve the generation of graphics representing large sets of event sequences to reduce clutter and improve understandability of the graphs would be beneficial.

SUMMARY

Event sequences analysis plays an important role in many application domains with a non-limiting set of uses including visualization of customer behavior analysis, electronic health record analysis, and vehicle fault diagnosis. The embodiments described herein provide a visualization techniques based on the minimum description length (MinDL) optimization process to construct an intuitive coarse-level overview of event sequence data while balancing the information loss in it. The method addresses a fundamental trade-off in visualization design: reducing visual clutter vs. increasing the information content in a visualization. The method enables simultaneous sequence clustering and pattern extraction and it is highly tolerant to noises such as missing or additional events in the data. Based on this approach, the embodiments provide a visual analytics framework with multiple levels-of-detail to facilitate interactive data exploration.

In one embodiment, a method for generating a graphical depiction of summarized event sequences has been developed. The method includes receiving, with a processor, a plurality of event sequences, each event sequence in the plurality of event sequences including a plurality of events, and generating, with the processor, a plurality of clusters using a minimum description length (MDL) optimization process, each cluster in the plurality of clusters including a set of at least two event sequences in the plurality of event sequences that maps to a pattern in each cluster. The pattern in each cluster further includes a plurality of events included in at least one event sequence in the set of at least two event sequences in the cluster. The method further includes generating, with the processor and a display output device, a graphical depiction of a first cluster in the plurality of clusters, the graphical depiction including a graphical depiction of a first plurality of events in the pattern of the first cluster.

In another embodiment, a system for generation of graphical depictions of a bipartite graph has been developed. The system includes a display output device, a memory, and a processor operatively connected to the display output device and the memory. The memory is configured to store program instructions and a plurality of event sequences, each event sequence in the plurality of event sequences including a plurality of events. The processor is configured to execute the program instructions to generate a plurality of clusters using a minimum description length (MDL) optimization process, and each cluster in the plurality of clusters includes a set of at least two event sequences in the plurality of event sequences that maps to a pattern in each cluster. The pattern in each cluster further includes a plurality of events included in at least one event sequence in the set of at least two event sequences in the cluster. The processor is further configured to generate a graphical depiction of a first cluster in the plurality of clusters with the display output device, the graphical depiction including a graphical depiction of a first plurality of events in the pattern of the first cluster.

BRIEF DESCRIPTION OF THE DRAWINGS

FIG. 12 is a pseudocode listing of an embodiment of a minimum description length optimization process for summarizing event sequences.

FIG. 13 is a pseudocode listing of another embodiment of a minimum description length optimization process with locality-sensitive hashing for summarizing event sequences.

FIG. 14 is a pseudocode listing of an embodiment of the process for merging clusters of FIG. 3.

DETAILED DESCRIPTION

Figure 1:
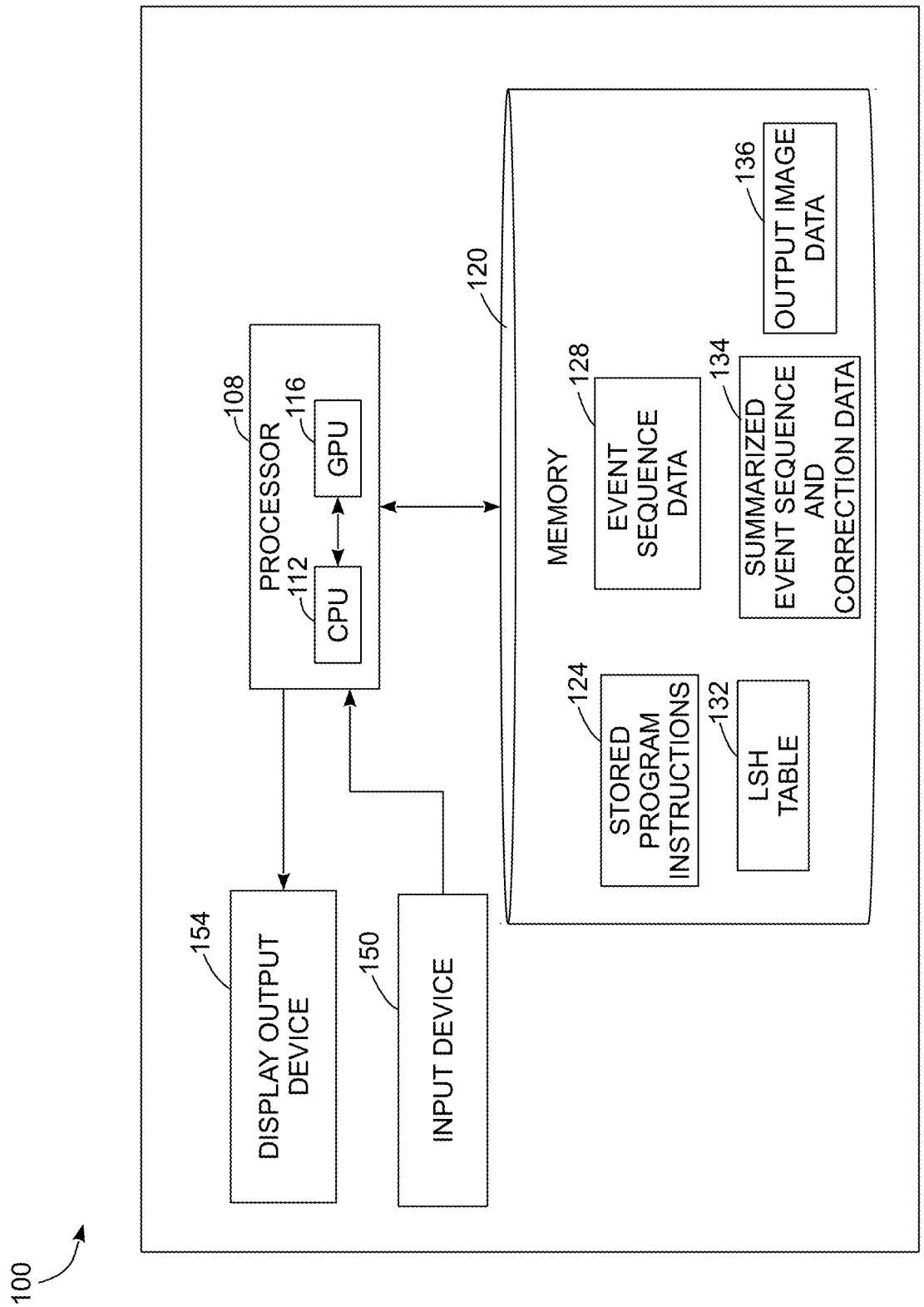
FIG. 1 is a schematic diagram of a system that generates graphical depictions of summarized event sequences.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

The embodiments described herein generate two-part graphical representations of a sequence of data that simplifies the display of the event sequence data into a set of patterns and a set of corrections, if needed, for sequences in the original input that do not exactly match one of the patterns. A sequence of data S is an ordered list of individual events $S=[e_1, e_2, \ldots, e_n]$ where $e_i \epsilon \Omega$ is an event alphabet. The events in each set of sequence data S forms a linear sequence that can also be referred to as a linear graph in which each node in the graph is an event in the sequence and the sequences are connected linearly in a sequence by edges. Given a set of event sequences $S=\{S_1, S_2, \ldots, S_m\}$, the embodiments described herein perform a minimum description length (MINDL) optimization process to identify a set of patterns $\mathcal{P} = \{P, P=[e_1, e_2, \ldots, e_i]\}$ and a mapping $f: \mathcal{S} \to \mathcal{P}$ from the event sequences to the patterns that minimize a total description length: $L(\mathcal{P}, f) = \Sigma_{P \in \mathcal{P}} L(P) + \Sigma_{S \in \mathcal{S}} L(S|f(S))$. In the preceding equation, L(P) is the description length of each pattern P and L(S|f(S)) is the description length of a sequence S given by the pattern f(S). Each pattern P can be described by listing all of the events that are in the pattern and an edit to the pattern P that changes an event can be fully specified by the position and the event involved to produce an alternative form of the total description length as: $L(\mathcal{P}, f) = \Sigma_{P \in \mathcal{P}} \text{len}(P) + \alpha \Sigma_{S \in \mathcal{S}} \|\text{edits}(S|f(S))\| + \lambda \|\mathcal{P}\|$ where len(P) is the number of events in the pattern P and edits(S|f(S)) is a set of edits that can transform the pattern f(S) back to the event sequence S. As described in more detail below, edits include event additions, event deletions, and transpositions between two successive events in a sequence. The parameter α is a numeric parameter that controls the amount of information displayed in the event sequence compared to the level of errors that are accepted in the summarization of the displayed events, where a more cluttered display generally has fewer errors and an uncluttered display generally has more errors. The parameter λ is added to directly control the total number of patterns P. Increasing λ reduces the number of patterns P that are present in the optimized result.

The mapping f clusters the event sequences together: sequences that map to the same pattern P can be considered to be in a single cluster. The cluster is denoted as a tuple $c=(P, G)$ where $G=\{S|S\epsilon \mathcal{S} \wedge f(S)=P\}$ is the set of sequences mapped to the pattern P. The set of tuples for all of the clusters is denoted as $\mathcal{C} = \{(P_1, G_1), (P_2, G_2), \ldots, (P_k, G_k)\}$ for k tuples where each of $\{G_1, G_2, \ldots, G_k\}$ forms a partition in the sets $\mathcal{S}$. The embodiments described herein seek to find an estimated mapping $\hat{f}$ and estimated set of patterns $\mathcal{P}$ that minimizes the total description length $L(\mathcal{P}, f)$ by finding an estimated set of clusters $\mathcal{C}$ that minimize the description length $L(\mathcal{C})$: $L(\mathcal{C})=\Sigma_{(P,G)\in \mathcal{C}} \Sigma_{S \in G}\|\text{edits}(S, P))\| + \lambda \|\mathcal{C}\|$.

The embodiments described herein minimize the description length of the clusters to enable graphical summarization of complex sequence data. The summarization includes a graphical display of the generated patterns in one or more clusters, where each pattern summarizes one or more of the input sequences S to reduce visual clutter. Because some sequences may not be completely accurately depicted by one of the patterns, the summarization also includes a graphical display of correction data for sequences that do not exactly match the pattern to ensure accuracy in the visual display of the event sequences.

FIG. 1 is a schematic diagram of a computer graphics system 100 that is configured to generate summarized graphical depictions of event sequences. The system 100 generates graphical depictions of patterns that summarize the event sequences with reduced clutter using the methods described herein. The system 100 includes a processor 108 that is operatively connected to a memory 120, input device 150, and a display output device 154. As is described in more detail below, during operation, the system 100 receives the event sequence data including multiple sequences from the memory 120 or another source, generates an output graphical depiction of a summary of the event sequence data based on a minimum description length optimization process that reduces clutter in the original event sequences, and optionally generates an output graphical depiction of correction graphics that provides corrections to errors, if any, that may be introduced in the summarized event sequence patterns.

In the system 100, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, into a single integrated device, while in other embodiments the CPU 112 and GPU 116 are connected to each other via a peripheral connection device such as PCI express or another suitable peripheral data connection. In one embodiment, the CPU 112 is a commercially available central processing device that implements an instruction set such as one of the x86, ARM, Power, or MIPS instruction set families. The GPU 116 includes hardware and software for display of at least two-dimensional (2D) and optionally three-dimensional (3D) graphics. In some embodiments, processor 108 executes software programs including drivers and other software instructions using the hardware functionality in the GPU 116 to accelerate generation and display of the graphical depictions of summarized event sequences and corrections that are described herein. During operation, the CPU 112 and GPU 116 execute stored programmed instructions 124 that are retrieved from the memory 120. The stored program instructions 124 include software that control the operation of the CPU 112 and the GPU 116 to generate graphical depictions of event sequences based on the embodiments described herein. While FIG. 1 depicts the processor 108 including the CPU 112 and GPU 116, alternative embodiments may omit the GPU 116 since in some embodiments the processor 108 in a server generates output image data 136 using only a CPU 112 and transmits the output image data 136 to a remote computing device that uses a GPU and a display device to display the image data. Additionally, alternative embodiments of the processor 108 can include microcontrollers, application specific integrated circuits (ASICs), field programmable gate arrays (FPGAs), digital signal processors (DSPs), or any other suitable digital logic devices in addition to or as replacements of the CPU 112 and GPU 116.

In the system 100, the memory 120 includes both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random access memory (RAM). In some embodiments the CPU 112 and the GPU 116 each have access to separate RAM devices (e.g. a variant of DDR SDRAM for the CPU 112 and a variant of GDDR, HBM, or other RAM for the GPU 116) while in other embodiments the CPU 112 and GPU 116 access a shared memory device. The memory 120 stores software programmed instructions 124 and data, including event sequence data 128, locality-sensitive hash (LSH) table 132, summarized event sequence and correction data 134, and output image data 136 of the summarized event sequences and corrections.

The memory 120 stores the event sequence data 128 in any suitable format including, for example, a data file format that stores sequences of data in a comma separated value (CSV), tab-delimited, space-delimited, or other delimited data format that stores sequences of the events. In other embodiments the system 100 receives graph data for the event sequences in a graph data format such as the DOT graph description language format, the graph modeling language (GML), various extensible markup language (XML) based formats including, but not limited to, GraphXML, GraphML, Graph Exchange Language (GXL), Extensible Graph Markup and Modeling Language (XGMML), and any other suitable data format that encodes the data for the nodes with a predetermined set of events E in an event dictionary, and each sequence includes an ordered combination of events from the set E in a sequence S. In the embodiments described herein, the event sequence data 128 includes multiple sequences where the term $S$ represents all of the event sequences of the event sequence data 128. In many instances the event sequence S represents the sequential occurrence of events over time, which is also referred to as a temporal sequence. However, the embodiments described herein can also produce graphical summarizations of other linear event sequences that place events in a sequential order even if the events are not ordered in a temporal sequence. The system 100 summarizes all of the event sequences $S$ to produce a graphical display of patterns that summarize the event sequences while reducing the visual clutter that occurs when merely displaying all of the event sequence data 128 directly.

The memory 120 optionally stores an LSH table 132 that the processor 108 generates based on the event sequence data 128. In the embodiment of FIG. 1, the memory 120 stores an LSH table 132 that improves the performance of finding clusters of patterns that have a high degree of similarity in a minimum description length optimization process. The LSH table 132 provides improved computational performance of the system 100 and is particularly beneficial for large sets of sequence data. As described below, however, in some embodiments the system 100 does not utilize the LSH table 132, and in these embodiments the memory 120 does not need to store the LSH table 132.

The memory 120 also stores the summarized event sequence and correction data 134. As described in further detail below, the system 100 generates the summarized event sequences as a set of one or more clusters in which each cluster includes a pattern that summarize one or more of the event sequences in the event sequence data 128. The system 100 generates graphical depictions of summarized event sequences based on the summarized event sequence data 134 to reduce visual clutter when visualizing multiple event sequences. The correction data enables the system 100 to track and generate a graphical display of corrections between the summarized event sequence pattern and one or more of the original event sequences if the pattern does not exactly match the event sequence.

The memory 120 also stores output summarized event sequences and correction image data 136, which include one or more sets of image data that the system 100 generates to produce a graphical output of a summary of the event sequence data and optionally a graphical depiction of corrections to the summarization of the event sequences. In some embodiments, the processor 108 generates the output image data 136 using a rasterized image format such as JPEG, PNG, GIF, or the like while in other embodiments the processor 108 generates the output image data 136 using a vector image data format such as SVG or another suitable vector graphics format.

In the system 100, the input device 150 includes any devices that enable the system 100 to receive the event sequence data 128. Examples of suitable input devices include human interface inputs such as keyboards, mice, touchscreens, voice input devices, and the like. Additionally, in some embodiments the system 100 implements the input device 150 as a network adapter or peripheral interconnection device that receives the event sequence data from another computer or external data storage device, which can be useful for receiving large sets of event sequence data in an efficient manner.

In the system 100, the display output device 154 includes an electronic display screen, projector, printer, or any other suitable device that reproduces a graphical display of the summarized event sequences and the correction graphics that the system 100 generates based on the event sequence data. While FIG. 1 depicts the system 100 implemented using a single computing device that incorporates the display output device 154, other embodiments of the system 100 include multiple computing devices. For example, in another embodiment the processor 108 generates the output image data 136 as one or more image data files that depict the summarized event sequences and corrections, and the processor 108 transmits the image data files to a remote computing device via a data network for display using a display output device that is incorporated in the remote computing device. The remote computing device displays the image data files, and in this embodiment the processor 108 is operatively connected to the display device in the remote client computing device indirectly instead of via the direct connection that is depicted in FIG. 1. In one non-limiting example, the processor 108 is implemented in a server computing device that executes the stored program instructions 124 to implement a web server that transmits the output image file data 136 to a web browser in a remote client computing device via a data network. The client computing device implements a web browser or other suitable image display software to display the output image data 136 received from the server using a display output device 154 that is integrated into the client computing device.

Figure 2:
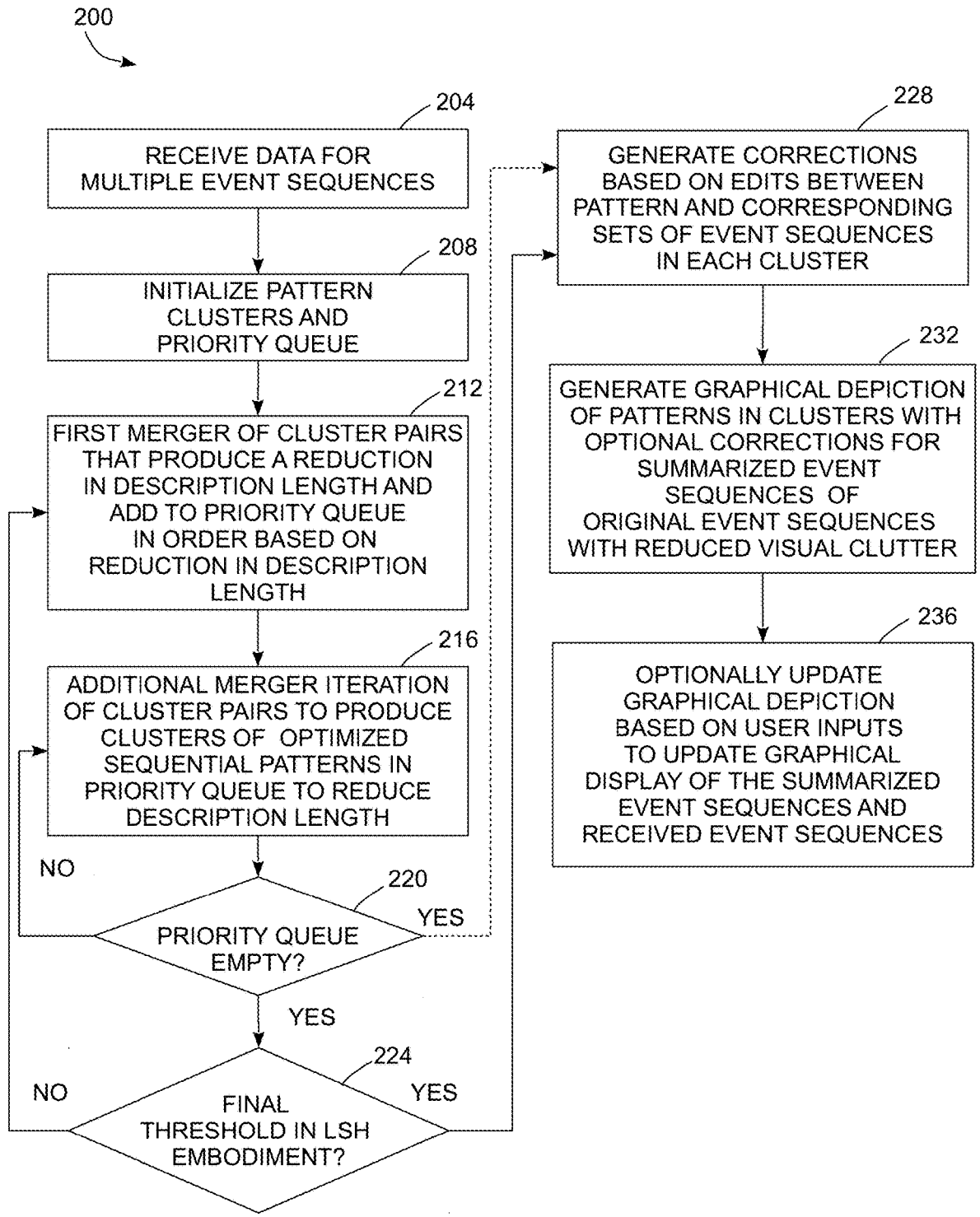
FIG. 2 is a block diagram of a process for generating graphical depictions of summarized event sequences.

FIG. 2 depicts a process 200 for the generation of graphical depictions of summarized event sequences. In the description below, a reference to the process 200 performing a function or action refers to the operation of a processor to execute stored program instructions to perform the function or action in association with other components in a computer graphics system. The process 200 is described in conjunction with the system 100 of FIG. 1 for illustrative purposes.

Figure 4:
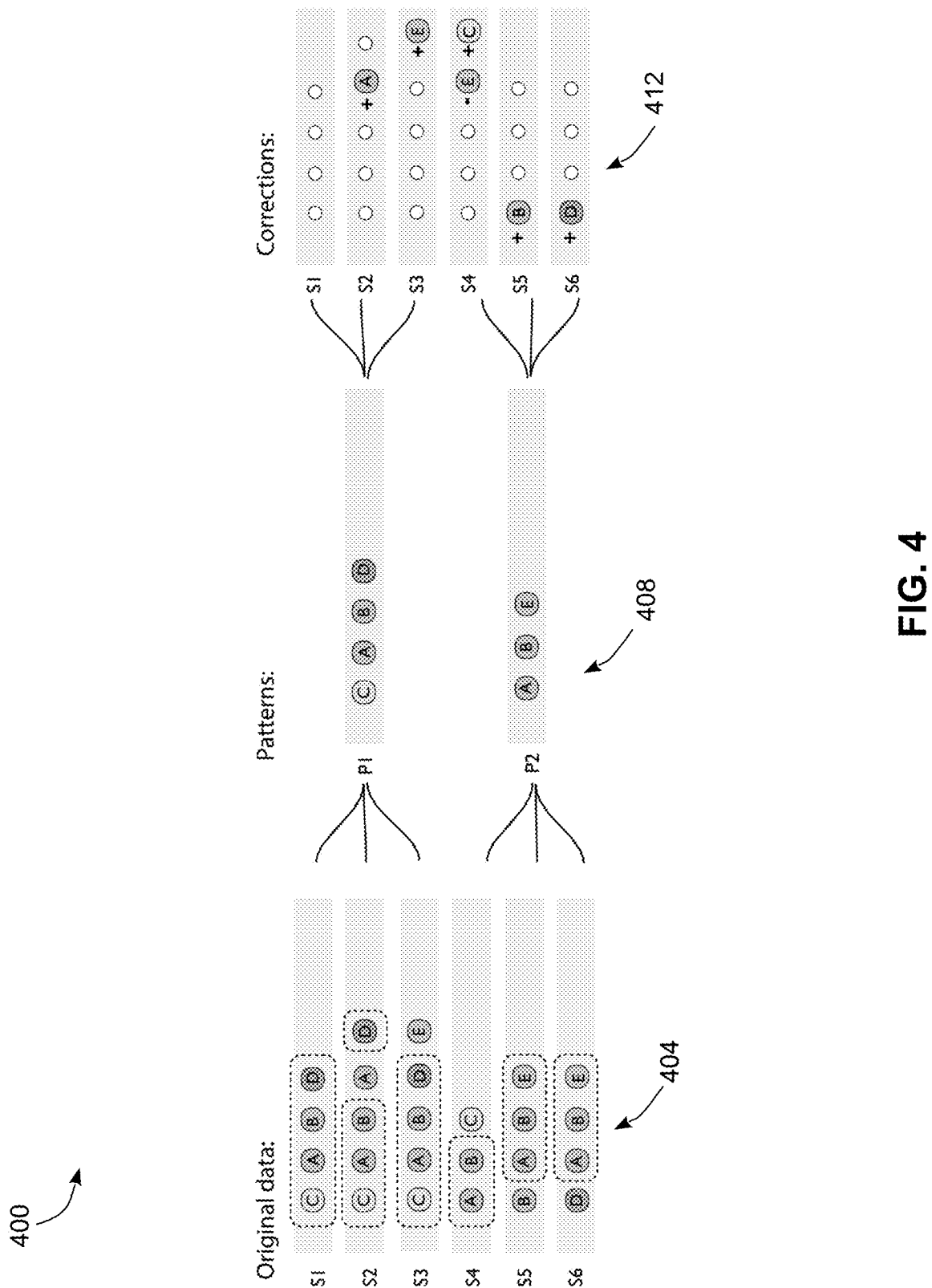
FIG. 4 is a diagram that depicts sequences, patterns, and corrections in a graphical depiction of summarized event sequences generated using the embodiments described herein.

The process 200 begins as the system 100 receives the event sequence data (block 204). The event sequence data includes multiple sequences in which each sequence includes a plurality of events E that are linked together linearly with edges to form a sequence. As depicted in FIG. 1 the system 100 stores the event sequence data 128 in the memory 120. FIG. 4 depicts an example of a plurality of six event sequences 404 that are labeled S1 . . . S6. Each of the event sequences includes two or more events in which each event is labeled as A . . . E in FIG. 4 for illustrative purposes, although of course each event label can correspond to a different event depending upon the domain of the event sequences in other embodiments. As depicted in FIG. 4, the events can occur in different orders in different sequences, an individual event may occur more than once in an individual sequence, and an individual sequence may include all of the possible events or only a subset of the possible events. The set of all six event sequences 404 forms the set $\mathcal{S}$. Each event sequence orders the events linearly left to right as depicted in FIG. 4 to form a linear sequence.

The process 200 continues as the system 100 initializes pattern clusters and a priority queue that are used in a minimum description length (MinDL) optimization process that occurs as part of the process 200 (block 208). In one embodiment, the processor 108 sets the initial patterns P to be equal to the original input sequences S and the mappings G between sets and patterns maps a single set S to the corresponding pattern P. In effect, the process 200 initially treats each initial input sequence S as an individual cluster that includes only one sequence. The initial set of all clusters $\mathcal{C}$ includes an individual pattern and individual sequence for each pattern that matches the original inputs. For example, as depicted in FIG. 4 the initial set of all clusters $\mathcal{C}$ includes a total of six clusters that each includes one pattern that matches exactly one of the six input sequences S1 . . . S6. As described in further detail below, the process 200 merges clusters to produce more compact patterns that reduce visual clutter while potentially producing patterns that do not exactly match the original input sequences. The processor 108 generates the priority queue Q is initialized to be empty. In more detail, FIG. 12 depicts a pseudocode listing 1200 of an embodiment of a portion of the process 200 that performs the MinDL optimization process using an exhaustive search to merge clusters together. FIG. 13 depicts another pseudocode listing 1300 of another embodiment of a portion of the process 200 that performs the MinDL optimization process that uses the locality-sensitivity hash (LSH) table 132 to merge clusters with a high degree of similarity together instead of using the exhaustive search process of FIG. 12.

The process 200 continues as the system 100 performs a first merger of pairs of clusters to fill the priority queue Q with clusters prior to performing additional iterative merging operations (block 212). Merging clusters together forms a new pattern that combines elements of the original sequences in two clusters, although the new pattern may not exactly match the original sequences in the two clusters. Additional details describing the merger operation between each pair of clusters is provided below in FIG. 3. FIG. 12 depicts one embodiment of the initial merging process in at least lines 3-8. In the embodiment of FIG. 12, the processor 108 merges every possibly pair-wise combination of clusters $(c_i, c_j)$ where i≠j (e.g. every pair-wise combination of clusters $c_1 \ldots c_6$ corresponding to the original sequences S1 . . . S6 in FIG. 4 excluding using the same cluster for both pair inputs, such as not merging S1 with S1). If the merger produces a merged cluster c* that also reduces the total description length compared to the original two clusters (ΔL>0) then the merged cluster c* is inserted into the priority queue Q along with the original source clusters $c_i, c_j$ that produced the combination and the value of ΔL. Thus, the initially merged clusters that are added to the priority queue Q each include a set of two event sequences that map to a pattern and the additional merging processes described below produces clusters that map larger sets of input event sequences to a single pattern if such mergers further reduce the description length. The priority Q stores the merged clusters c* with the clusters having the largest ΔL values stored at the front of the queue in descending order based on ΔL.

While the process of FIG. 12 identifies pairs of clusters that produce a reduction in the total description length ΔL, the process requires merging and comparing every possible combination of clusters, which can be computationally inefficient for large sets of clusters. The embodiment of FIG. 13 presents a more computationally efficient process to perform the first merger also includes initialization of the LSH table 132 in at least lines 5-16. The processor 108 generates the LSH table 132 from all of the clusters using a locality sensitive hashing scheme that is otherwise known to the art. The LSH scheme enables the processor 108 to perform a computationally efficient nearest neighbor search process to search through all of the clusters $\mathcal{C}$ given an input cluster $c_i$ and identify any clusters (zero, one, or more clusters may be identified) that are have a Jaccard similarity index that is above a predetermined threshold value th compared to the input cluster $c_i$. A higher Jaccard similarity index value indicates a higher degree of similarity between the two clusters and vice versa. In the system 100, the Jaccard similarity index for two clusters $c_i$ and $c_j$ is:

$$J(c_i, c_j) = \frac{\|S_i \cap S_j\|}{\|S_i \cup S_j\|}$$

where $S_i$ is the set of unique events in the pattern $P_i$ representing cluster $c_i$ and $S_j$ is the set of unique events in the pattern $P_j$ representing cluster $c_j$. In the embodiments described herein the values of $J(c_i, c_j)$ range from [0, 1]

where 0 indicates the lowest level of similarity and 1 indicates the maximum level of similarity.

In the LSH embodiment that is depicted in FIG. 13, the processor 108 initializes the LSH table 132 using lshInit function with a predetermined threshold value th that is selected in a range of [0, 1]. Two clusters with high similarity will have a Jaccard index value that exceeds th with high probability. The processor 108 uses the lshInsert function to add each of the clusters $c_i$ in $C$ into the LSH table 132. During the first merger process, the processor 108 identifies only similar clusters that exceed the threshold $th_{start}$ of each cluster $c_i$ to test with the merge function to determine if the merged cluster c* results in a reduced description length ($\Delta L > 0$). If the merger produces a merged cluster c* that also reduces the total description length compared to the original two clusters ($\Delta L > 0$) then the merged cluster c* is inserted into the priority queue Q along with the original source clusters $c_i$, $c_j$ that produced the combination and the value of $\Delta L$ in the same manner as described above with reference to FIG. 12. The embodiment of FIG. 13 is more computationally efficient although in some situations the embodiment of FIG. 12 may identified merged clusters with slightly greater $\Delta L$ values because the process of FIG. 12 exhaustively searches all pair-wise cluster mergers while the process of FIG. 13 does not generally test all cluster pairs outside of certain situations in which all of the input sequences have a high Jaccard similarity. However, the nearest neighbor search using the LSH table 132 enables the system 100 to identify pairs of clusters that have a high likelihood of being similar, and therefore having large description length reduction $\Delta L$ values when merged, with a high probability.

Referring again to FIG. 2, the process 200 continues as the system 100 performs an iterative merging process to merge additional clusters together to further reduce the description length in an iterative MinDL optimization process (block 216). During the process 200 the processor 108 merges additional clusters, which are themselves further composed of smaller clusters, in an iterative process to further reduce the description length of all the clusters until reaching the minimum description length. FIG. 12 depicts this process in at least lines 9-20. In the embodiment of FIG. 12, the processor 108 retrieves the first entry from the priority queue (including the merged cluster c*, parent clusters $c_i$ and $c_j$, and the description length reduction value $\Delta L$) that has the largest $\Delta L$ value and assigns this cluster the label $c_{new}$. The processor 108 adds the cluster $c_{new}$ to the total set of clusters $C$ and also deletes all other clusters in $C$ and other priority queue entries, if any, that include either of the parent clusters ci and cj that were used to form the merged cluster c* of the new cluster $c_{new}$. The deletion process ensures that each event sequence in the original input appears only once in the final summarized output event sequence. In FIG. 12, the processor 108 then performs another exhaustive search that tests mergers between $c_{new}$ and all of the remaining clusters in the cluster set $C$ to determine if the merger reduces the description length ($\Delta L > 0$). Any newly merged clusters c* that meet the criteria of $\Delta L > 0$ are added back into the priority queue Q with new parent clusters c and $c_{new}$. This process reduces the total number of entries in the priority queue Q during each iteration.

In the embodiment of FIG. 13, the processor 108 also performs the iterative merger process as depicted in at least lines 17 to 29. The iterative merger process of FIG. 13 is similar to that of claim 12 but once again in the embodiment of FIG. 13, the processor 108 uses the LSH table 132 to perform a search query using the $c_{new}$ cluster having the highest $\Delta L$ that is taken from the priority queue Q. The search query results provide a list of clusters that typically includes fewer clusters for merger tests than the full search performed in the embodiment of FIG. 12, which once again improves the computational efficiency of the embodiment of FIG. 13. Once again, in FIG. 13 if the merger of $c_{new}$ with another cluster c that is identified from the LSH table query produces a merged cluster c* that reduces the description length ($\Delta L > 0$) then the newly merged cluster c* along with $\Delta L$, c and $c_{new}$ are added to the priority queue Q. Once again, this process reduces the total number of entries in the priority queue Q during each iteration.

The process 200 continues as the system 100 performs additional merger operations as described above in block 216 for as long as the priority queue Q still includes elements and is not empty (block 220). In the embodiment of FIG. 12, once the priority queue Q is empty the set of clusters $C$ is the final output that the system 100 uses to generate the graphical depiction of the summarized event sequence (FIG. 12, line 21). In the embodiment of FIG. 12, the process 200 continues to the processing of block 228 that is described below. In the embodiment of FIG. 13, the processor 108 determines reduces the Jaccard similarity threshold th by a predetermine factor $th_{rate}$ as is depicted in line 30 of FIG. 13. Reducing the threshold value th enables the processor 108 to generate a new LSH table 132 that matches a broader range of clusters in a nearest neighbor search for an input cluster, which effectively broadens the search results in the embodiment of FIG. 13. In the MinDL optimization using the LSH table embodiment of FIG. 13, the process 200 continues with the processing of blocks 212-224 using the final set of clusters $C$ as the input to each iteration of blocks 212-224 until the threshold th drops below a predetermined final threshold value $th_{end}$ and the set of clusters $C$ from the final iteration of blocks 212-224 is the final output that the system 100 uses to generate the graphical depiction of the summarized event sequence (FIG. 13, line 32). In the system 100, the processor 108 stores the final cluster data $C$ in the summarized event sequence data 134 in the memory 120.

Figure 5:
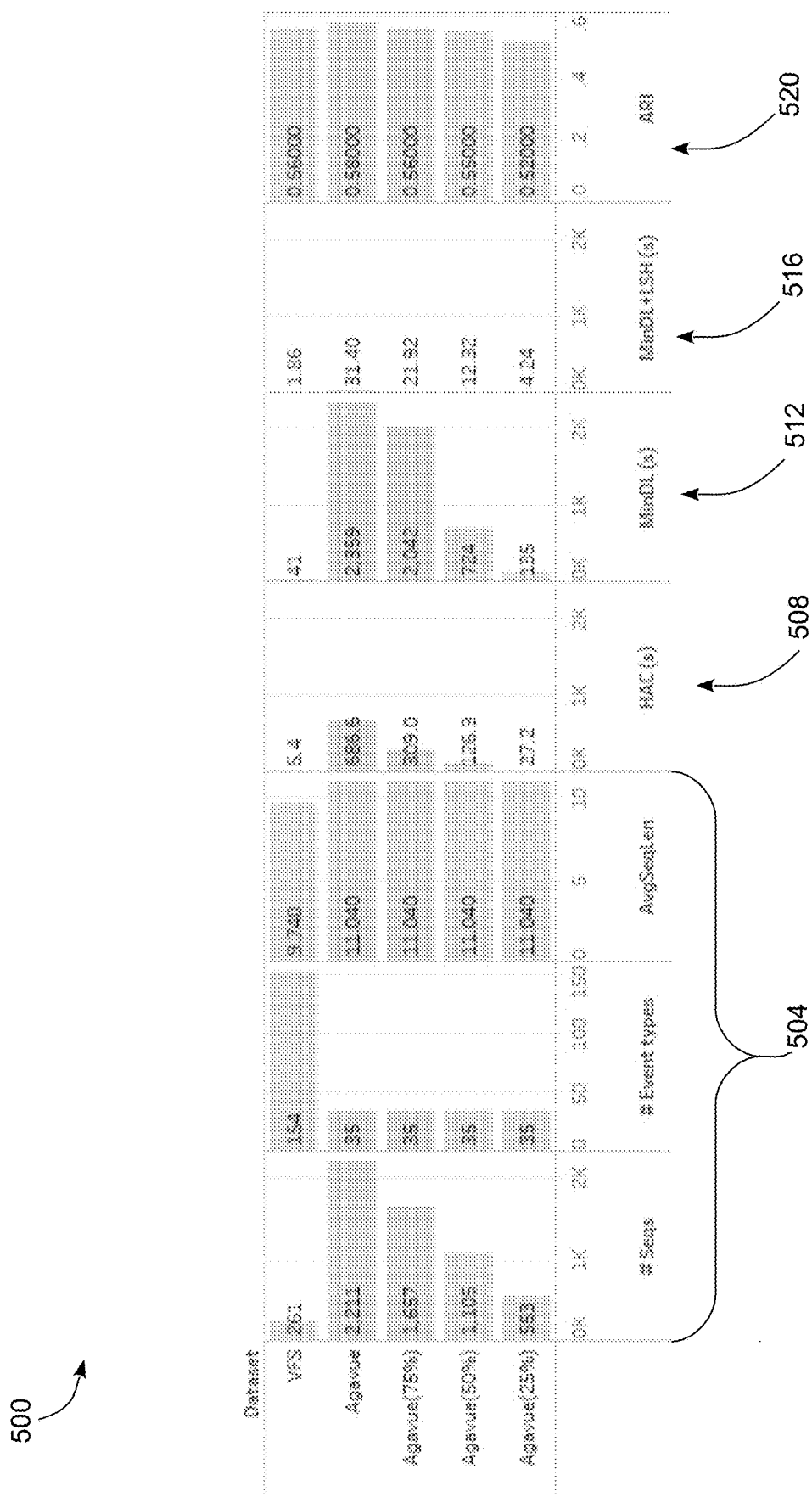
FIG. 5 is a graph that depicts processing time requirements for generating summarized event sequences with the embodiments described herein using a sample input set of event sequences.
Figure 6:
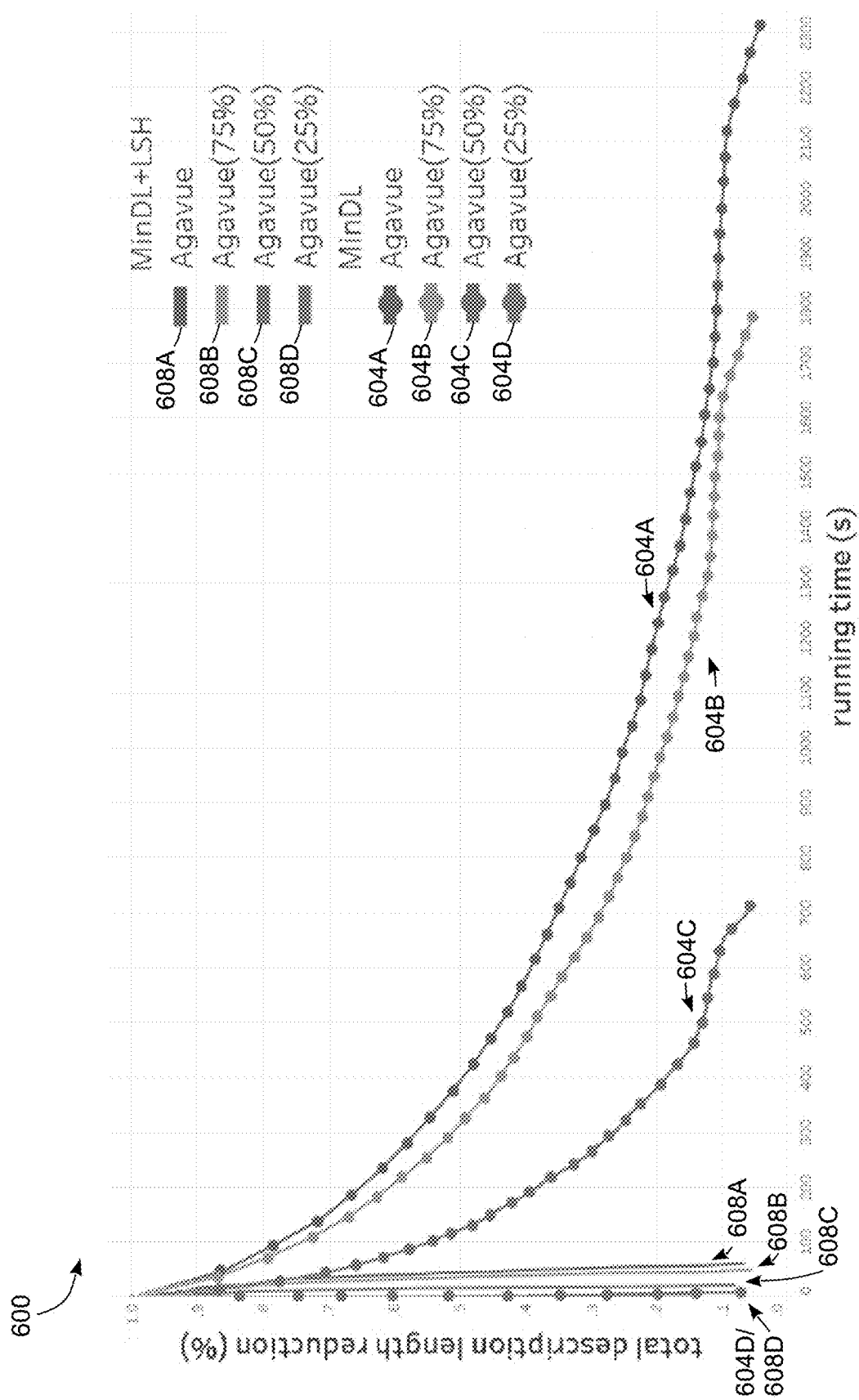
FIG. 6 is a graph depicting the processing time requirements for generating summarized event sequences with varying levels of total description length reduction with the embodiments described herein using sample input sets of event sequences.

FIG. 5 and FIG. 6 depict computational performance characteristics of the embodiments of FIG. 12 and FIG. 13 that are described above. FIG. 5 depicts a table 500 of various sets of sequence inputs that are selected from the "Agavue" event sequence data set, which is a publicly available data set of input sequences including columns 504 that specify the number of sequences, number of event types, and average length of each sequence. Column 508 depicts execution times in seconds for a prior-art hierarchical agglomerative clustering (HAC) process that clusters the sequences for each input but that does not minimize the description length for patterns as described herein. Column 512 depicts the execution time in seconds for the minimum description length (MinDL) process of FIG. 12 and column 516 depicts the execution time in seconds for the MinDL+ LSH process of FIG. 13. As depicted in FIG. 13, the MinDL+LSH process performs substantially faster than either of the HAC or MinDL embodiments while providing improved accuracy that is similar to the MinDL embodiment. The "ARI" metric in column 520 refers to a comparison of the clustering results from the embodiment of FIG. 12 to the embodiment of FIG. 13 to ensure that the LSH embodiment of FIG. 13 provides similar (although not necessarily identical) cluster results to the MinDL embodiment of FIG. 12 using the Adjusted Rand Index (ARI) metric. ARI is a common metric to compare clustering results that ranges from −1 to 1 where 0 means random clustering and 1 means identical results. An ARI larger than 0.5 means that the results have a high degree of similarity, and as depicted in FIG. 5 both the embodiments of FIG. 12 and FIG. 13 produce similar clusters with ARI scores>0.5 for all of the test inputs.

FIG. 6 is another graph 600 of the total description length (vertical axis) that is produced over multiple iterations of the processes of FIG. 12 and FIG. 13 plotted against execution time (horizontal axis) for the various subsets of the Agavue event sequence data set (Agavue (100%), Agavue 75%, Agavue 50%, and Agavue 25%). As depicted in FIG. 6, the graph plots 604A-604D each plot the minimum description length and processing time for different subsets of the Agavue data using the MinDL embodiment of FIG. 12. As depicted in FIG. 6, the processing time increases rapidly at a rate of $O(n^2)$ from the comparatively fast Agavue 25% plot 604D to the Agavue plot 604A. The graph plots 608A-608D each plot the minimum description length and processing time for different subsets of the Agavue data using the MinDL+LSH embodiment of FIG. 13. As these plots show substantially better scaling since the LSH table 132 enables the processor 108 to perform substantially fewer merge operations to identify clusters with a minimum description length, although as depicted in the graph 600 the overhead of setting up the LSH hash tables in the embodiment of FIG. 13 may make this process slightly more computationally expensive for very small data sets compared to the embodiment of FIG. 12. Additionally, while the plots 604A-604D and 608A-608D both reach similar minimum description length results, a careful review of the graph 600 shows that MinDL embodiment of FIG. 12 can produces slightly shorter minimum description lengths in some instances because the MinDL process of FIG. 12 exhaustively test mergers between all of the pair-wise combinations of clusters. The MinDL+LSH embodiment of FIG. 13 uses the LSH tables to produce similar minimum description lengths while providing substantially shorter computation times for larger sets of sequence data.

Figure 3:
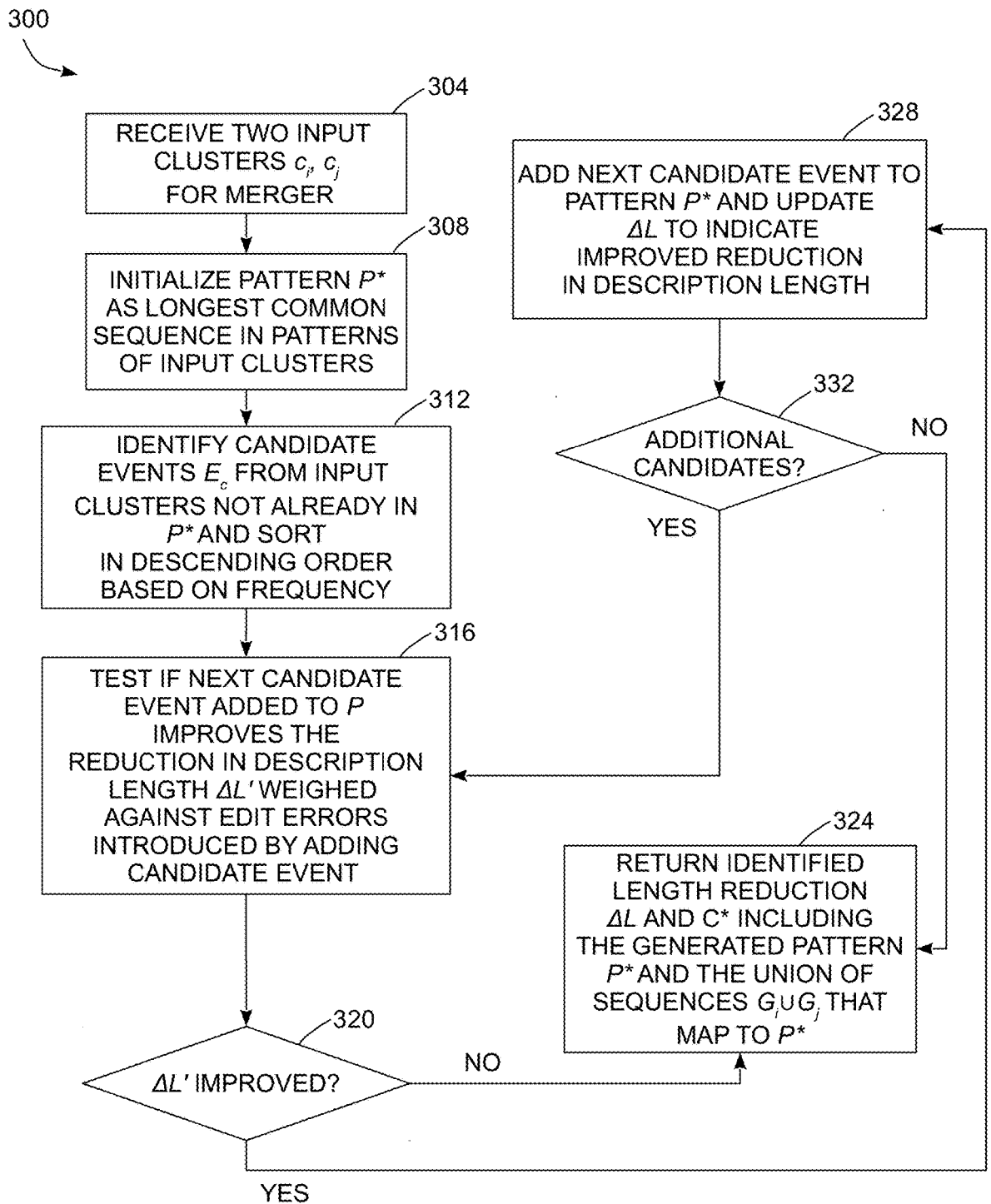
FIG. 3 is a block diagram of a process for merging clusters during the process of FIG. 2.

As described above, the process 200 performs a pair-wise merging process between pairs of clusters. FIG. 3 depicts the cluster merging process that occurs during blocks 212 and 216 in the process 200 in more detail. In the description below, a reference to the process 300 performing a function or action refers to the operation of a processor to execute stored program instructions to perform the function or action in association with other components in a computer graphics system. The process 300 is described in conjunction with the system 100 of FIG. 1 and the pseudocode listing 1400 of FIG. 14 for illustrative purposes.

The process 300 begins as the process 300 receives two clusters $c_i$ and $c_j$ as inputs for merger (block 304). As described above and depicted in FIG. 14, each cluster includes a pattern ($P_i$ and $P_j$) as well as mappings ($G_i$ and $G_j$) of sequences in the original set of input sequences S that correspond to each pattern in the cluster.

The process 300 continues as the processor 108 initializes a pattern P* based on the longest common sequence (LCS) of events that are common to both of the patterns $P_i$ and $P_j$ in the input clusters (block 308). The longest common pattern refers to a set of events in each pattern that match each other with the pattern that includes the largest number of events being considered the longest common sequence. Using FIG. 4 as an example, the sets S5 and S6 show a longest common sequence of events "A B E" where both the contents of the events and the order of the events match to form the longest common sequence between the two sets. The same process is applicable to input patterns in clusters that have been generated from one or more smaller clusters during the process 200.

The process 300 continues as the processor 108 identifies a set of candidate events $E_c$ that are eligible to be included in the merged cluster and sorts the candidate events based on frequency in descending order (block 312). As depicted in FIG. 14, the processor 108 identifies the candidate events as events that are not already in the LCS pattern P*, which FIG. 14, line 2 describes as $E_c=P_i-P\cup P_j-P$ where P=P*, the LCS. The processor 108 tests candidate events $E_c$ that occur with the highest frequency first for inclusion in the merged pattern first as is described below.

The process 300 continues as the processor 108 tests the candidate events $E_c$ in order starting with the candidate events that have the highest frequency to identify a new reduction in the description length $\Delta L'$ that occurs if the candidate event is merged into the pattern P* (block 316). As depicted in FIG. 14, the processor 108 tests a new pattern P by adding the candidate event e to the existing LCS P* and identifies $\Delta L'$ as: $\Delta L'=\text{len}(P_i)+\text{len}(P_j)-\text{len}(P)-\alpha\Sigma_{S\in G_i\cup G_j}\text{edits}(S, P)+\lambda$. Recalling that positive values of $\Delta L'$ represent a reduction in the description length while negative values represent an increase in the description length, this equation balances the improvements to reducing the description length in the merged pattern P against the negative effects of adding the candidate event. In particular, the term $\alpha\Sigma_{S\in G_i\cup G_j}\text{edits}(S, P)$ uses the $\alpha$ coefficient to adjust the relative weight of the required edits to the pattern P that are required to correct the pattern P in order to reproduce the original sequences S from both of the input clusters ($G_i\cup G_j$), while the $\lambda$ coefficient can be used to adjust the relative weight of merging the clusters in reducing the description length.

Figure 7:
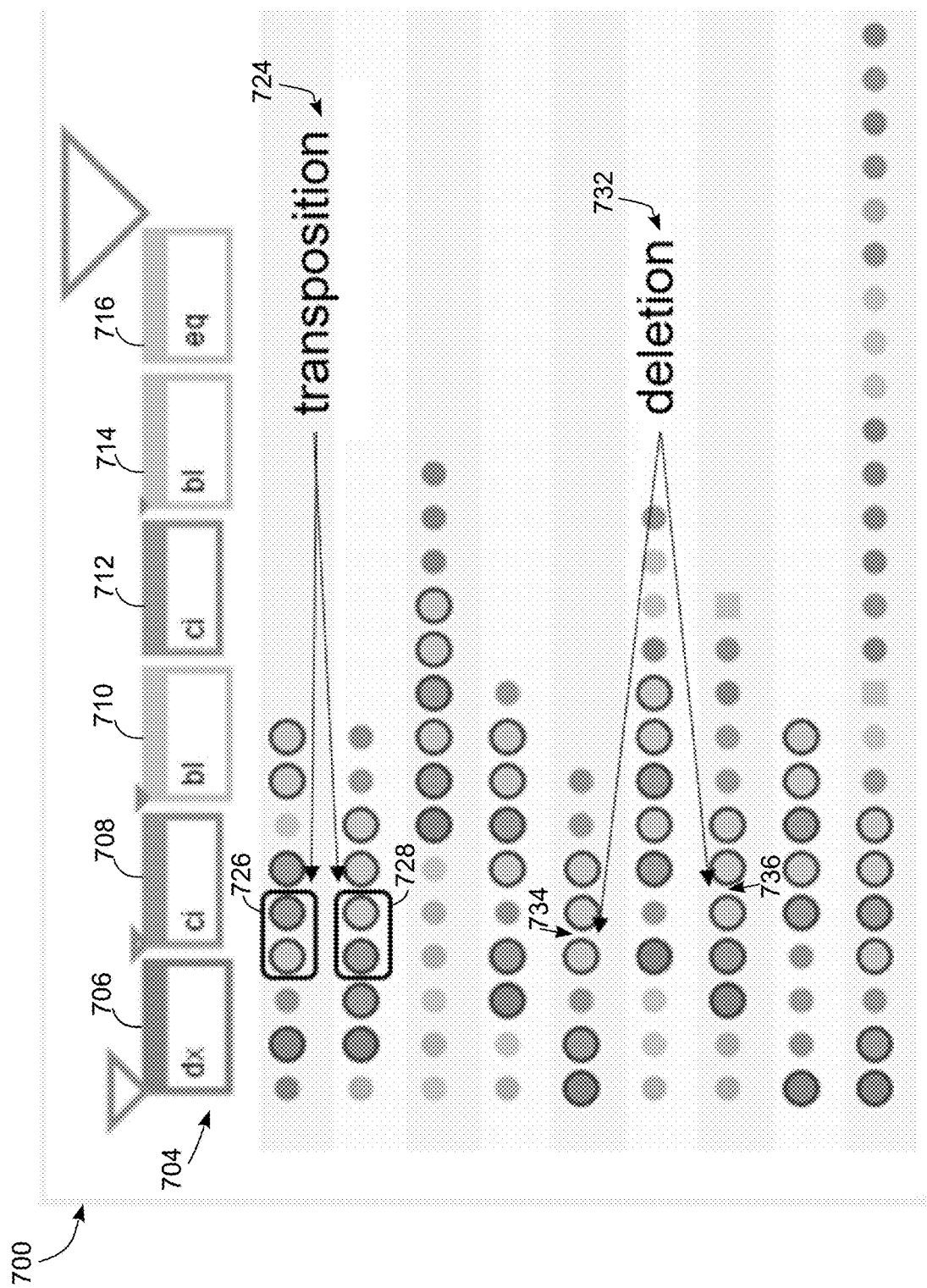
FIG. 7 is a diagram depicting edits that occur to correct a pattern to match sequences that are mapped to the pattern in a summarization of event sequences.

In the equation above the edits represent errors between the sequence of events in the pattern P and the events in one or more of the original event sequences in the cluster that the processor 108 identifies in the MinDL optimization process. The processor 108 also identifies errors based on the edits as the basis for generating corrections via a graphical display of correction data that is described in further detail below to reproduce one or more of the original sequences S that are included in a cluster with the pattern P. Examples of edits include deletions of one or more events in P to match one of the original sequences S, insertions of events into P to match S, and pair-wise transpositions of events in P to reorder events to match S. FIG. 7 depicts a graph 700 of a graphical display of a pattern 704 that summarizes a set of input sequences that are mapped to the pattern 704. The pattern 704 includes an ordered sequence of events 706, 708, 710, 712, 714, and 716. FIG. 7 depicts transposition edits 724 in which the order of two events in the pattern 704 is different than the order of the events in the original sequences, such as transposition 726 that requires a transposition edit to reverse the order of events 708 and 710 in the pattern 704 and transposition 728 that requires a transposition edit to reverse the order of events 710 and 712 in the pattern 704. FIG. 7 also depicts deletion edits 732 with a first deletion edit 734 corresponding to a requirement to delete event 712 from the pattern 704 to match one of the original sequences S and a second deletion edit 736 that also deletes the event 712 from the pattern 704 to match another sequence S. While not shown expressly in FIG. 7, in another embodiment an insertion edit requires a new event to be inserted into the pattern 704 to match one of the sequences in the cluster. While the edits described above correspond to necessary changes in the pattern 704 to reproduce one or more of the original input sequences, in another configuration the edits can be described in reverse as the edits that are required to be made to each sequence to reproduce the pattern in a similar manner to that described above.

Referring again to FIG. 3 and FIG. 4, the processor 108 also uses the λ coefficient as a counter-balance to α to bias the reduction in description length to a positive value (or further to a negative value if λ is set to a negative value). In the system 100, the α and λ coefficients used in the process 300 are stored with the program instructions 124 in the memory 120 and can be adjusted to change the balance between compact visualizations of patterns and the accuracy of each displayed pattern during the merge operation in the processes 300 and 200. The balancing operation during the identification of ΔL' enables the system 100 to avoid simply merging all of the input sequences into a single pattern. While some sets of event sequence inputs can be merged into a single cluster effectively, many complex event sequence inputs cannot effectively be represented by a single pattern, which would maximize the reduction in visual clutter but would introduce an unacceptably high number of edit errors into the graphical depiction of the summarized event sequence.

If the result of ΔL' indicates that the next candidate event improves the minimum description length, then the processor 108 adds the candidate event to the pattern P* by using the candidate pattern P as the new value of P* and updates the value of ΔL=ΔL' (block 328). If another candidate event is present (block 332), then process 300 returns to block 316 to test the next candidate event. The process 300 continues to merge candidate events until either all of the candidate events are merged (blocks 332) or until the tested merger for the next candidate event e produces either an absolute increase in the description length (ΔL'<0) or otherwise reduces the effective description length reduction ΔL that has been achieved during an earlier iteration of the merge process (ΔL'<ΔL) (block 320). As described above, the merged patterns P and P* always include events that are included in at least one of the two input patterns $P_i$ and $P_j$ that in turn correspond to events in at least one of the event sequences of $G_i$ and $G_j$, although the final merged pattern may not exactly match either or both of the original input patterns. As depicted in FIG. 14, while some mergers of clusters produce a reduction in the description length, in some instances a merger of two clusters cannot actually decrease the total description length and the process 300 returns a merged cluster than has a negative or zero final value of ΔL, which the process 200 discards to avoid increasing the description length during the process 200. The process 300 then returns the final value of ΔL and the merged cluster with the final value of P* and a union of all the original input sequences ($G_i \cup G_j$) that are mapped to the merged pattern P* (block 324). The final value of P* also referred to as the optimal sequential pattern for the two input patterns $P_i$ and $P_j$ because the merger process 300 generates the merged pattern P* with the largest description length reduction ΔL, if any reduction is feasible, in the description length of the two input patterns $P_i$ and $P_j$.

Referring again to FIG. 2, the process 200 continues as the processor 108 generates the corrections to the pattern in each cluster based on the edits to the pattern in each cluster that are required to reproduce the sequences in each cluster (block 228). In one embodiment, the corrections are equivalent to the edits that the processor 108 identifies during the cluster merge operation of the process 300 including, for example, the addition edits, deletion edits, and transposition edits, which may be further represented as a combination of an addition edit and a deletion edit. The processor 108 identifies the edits between the final pattern $P_i$ in each cluster $c_i$ including the transpositions, deletions, and insertions that map the final pattern $P_i$ to each event sequence S in the group of event sequences $G_i$ for the cluster $c_i$. The processor 108 stores the correction data in association with the summarized event sequence data 134 in the memory 120.

The process 200 continues as the processor 108 generates a graphical depiction of one or more of the summarized event sequence patterns and optionally a graphical display of corrections for a summarized event sequences of the original event sequences $S$ with reduced visual clutter (block 232). In the system 100, the processor 108 generates the graphical depiction data 136 based on the summarized event sequence and correction data 134 and uses the display output device 154 to display the graphical depiction of the patterns and corrections in the summarized event sequences or transmits the output image data 136 to a remote computing device for display. The graphical depiction can include the pattern for one cluster in the plurality of clusters, patterns for a subset of the clusters including at least two clusters in the plurality of clusters, or all of the clusters depending upon the complexity of the clusters and the effective size of the output device 154. The processor 108 also updates the output image data 136 for display with the display output device 154 or transmission to a remote computing device for display based on interactive user inputs that are described in more detail below.

FIG. 4 depicts an example of graphical depiction of summarized event sequences 408 that the system 100 generates based on the input sequences 404 of FIG. 4. In FIG. 4 the system 100 generates a graphical depiction of the event sequences of the patterns P1 and P2 in the two clusters. As depicted in FIG. 4, the pattern P1 summarizes a first subset $G_1$ of the original set of event sequences including sequences S1 . . . S3 while the pattern P2 summarizes a second subset $G_2$ of the event sequences including sequences S4 . . . S6. FIG. 4 also includes a graphical depiction of the correction data 412 that specifies the specific events that are being corrected, the relative position of the event, and the type of correction, including addition corrections (+) and deletion corrections (−) in FIG. 4. For example, sequence S2 in the pattern P1 includes a correction of an addition of the event A (+A) at the fourth position in the original sequence S2. Another set of corrections for sequence S4 in the pattern P2 includes a deletion correction to remove the event E (−E) at the fourth position and an addition correction for event C (+C) to add event C at the fifth position. In the embodiment of FIG. 4, each correction includes a graphical indicator that specifies both the type of correction (e.g. the +/−graphical icons for addition and deletion edits) and that identifies the event that is the subject of the correction. Since the original sequences S1 . . . S6 can have different lengths from each other and from the corresponding patterns in the event sequence summarization, the graphical display of corrections 412 also displays graphical symbols (a set of circles in FIG. 4) to indicate the actual length of each of the original sequences. While FIG. 4 depicts a graphical display of all of the corrections 412 for illustrative purposes, in an alternative configuration the system 100 generates the graphical display of the summarized event sequence 408 and provides an interactive user interface to enable a user to select an individual pattern (P1 or P2) or an individual sequences (S1 . . . S6) to show correction data for a limited subset of the event sequences in order to reduce the total amount of information that is displayed simultaneously.

Figure 8:
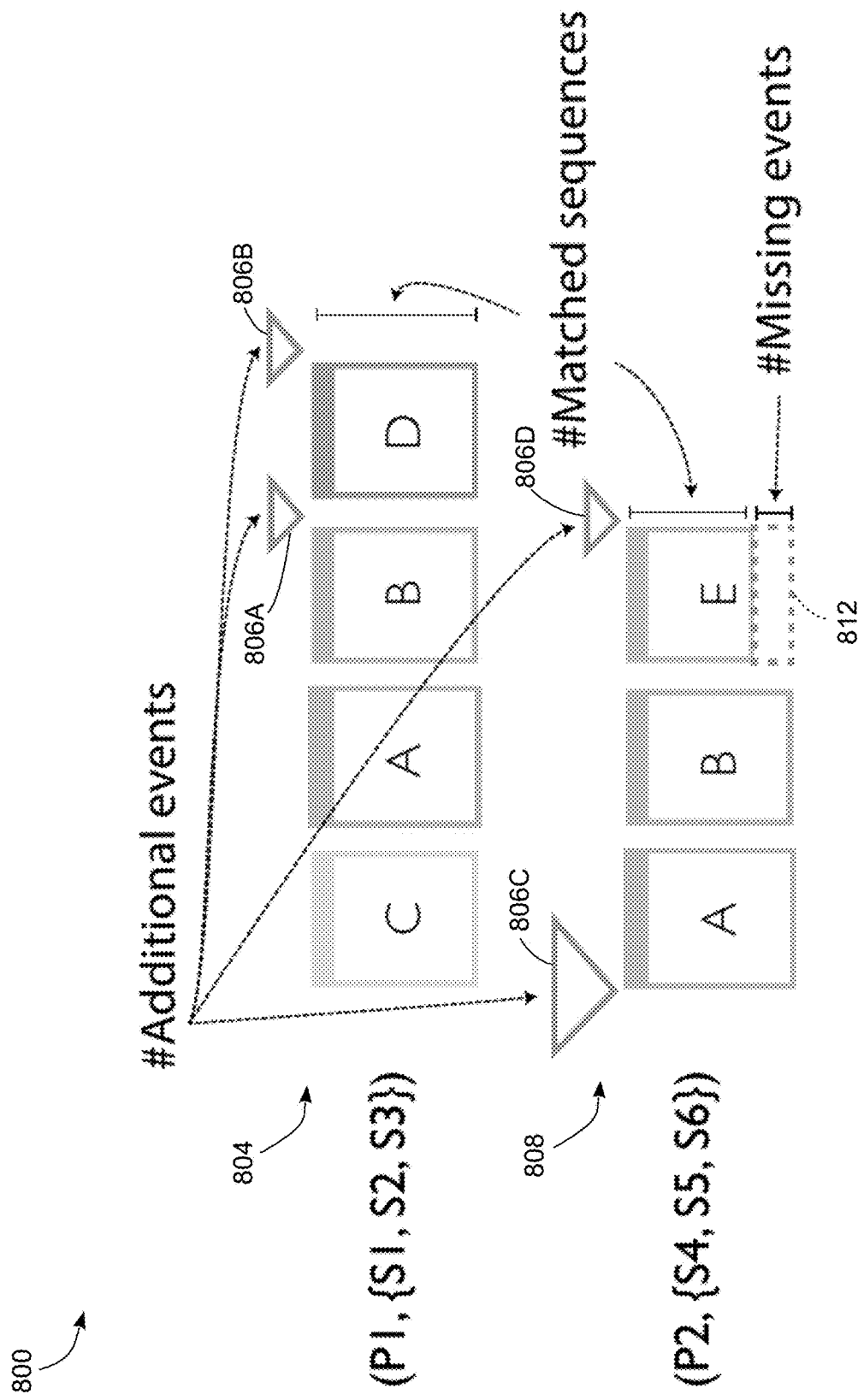
FIG. 8 is a diagram depicting one embodiment of summarized correction data.

FIG. 8 depicts another embodiment of a graphical depiction of the summarized event sequences 800 that is based on the same event sequences 404 and clusters including the patterns 408 of FIG. 4. In FIG. 8, the summarized event sequences 800 include graphical depictions of patterns 804 and 808 that further include graphical indicators that depict corrections. The graphical depictions of patterns with corrections 804 and 808 each include graphical indicators of addition corrections 806A-806D, which are depicted as triangles in FIG. 8 and indicate the positions of events that are missing from the summarized graphical depiction of the patterns P1 and P2. In the embodiment of FIG. 8, the size of the addition correction triangles can vary to indicate the number of events that are missing at each position, such as the addition correction triangle 806C in the graphical depiction 808 of the pattern P2 that has a larger size than the other addition correction triangles 806A, 806B, and 806D. The graphical depiction 808 also includes a graphical indicator of a deletion correction 812, which is depicted as a dashed rectangle associated with graphical depiction of the event E in the pattern P2 to indicate that one or more of the sequences S4 . . . S6 does not include the event E. The size of the deletion correction 812 can also vary based on the number of sequences that do not include an event in the corresponding pattern (e.g. the size of the dashed rectangle 812 is proportional to the number of sequences that do not include the event E). While FIG. 8 depicts the addition corrections as triangles and deletion corrections as dashed rectangles, alternative embodiments can use different graphical symbols to depict the corrections. The graphical depictions 804 and 808 including the events in each pattern and the correction graphical indicators are also referred to as "lossy" corrections to the summarized event sequence representation because the graphical depictions 804 and 808 provide some information about the addition and deletion corrections, but do not display full correction information for each of the event sequences that correspond to the patterns P1 and P2.

In more detail, the graphical depiction 804 of the pattern P1 includes the same events C A B D that are depicted in the pattern P1 of FIG. 4, and further includes the correction triangles 806A and 806B that indicate some of the sequences S1 . . . S3 in the cluster of the pattern P1 also include additional events that are not directly displayed in the graphical depiction 804. The addition corrections 806A and 806B indicate the position in the pattern P1 at which some of the event sequences include additional events (e.g. between events A and D for the addition correction 806A). In FIG. 8, the graphical depiction 808 of the pattern P2 includes addition corrections 806C and 806D as well as the deletion correction 812. The addition correction 806C occurs prior to the start of the pattern P2 (before event A) and has a larger size than the triangles of the other addition corrections since, as depicted in FIG. 4, two of the sequences S5 and S6 start with events that are not present in the graphical depiction 808 of the pattern P2 while the smaller addition correction triangle 806D only corresponds to an addition correction for a single sequence S4.

In some embodiments, the system 100 generates an interactive user interface to enable a user to select the addition corrections 806A-806D, the deletion correction 812, or other elements in the graphical depiction 804 using the user interface device 150 to provide more detailed correction information for all or a portion of the event sequences in the patterns of the summarized event sequence. For example, in one embodiment the processor 108 generates a graphical depiction of the event sequences S5 and S6 from FIG. 4 to provide a detailed graphical depiction of the correction in response to a user input via the input device 150 that selects the correction triangle 806C. The system 100 generates the detailed graphical depiction of the sequences S5 and S6 because the addition correction triangle 806C for the pattern P2 is a lossy graphical indicator for elements B in S5 and D in S6 that are not present in the graphical display of the pattern P2. The system 100 optionally highlights the element B in the graphical depiction of S5 and the element D in the graphical depiction of S6 to provide an easily understandable graphical indicator of the differences between these event sequences and the pattern P2.

Figure 9:
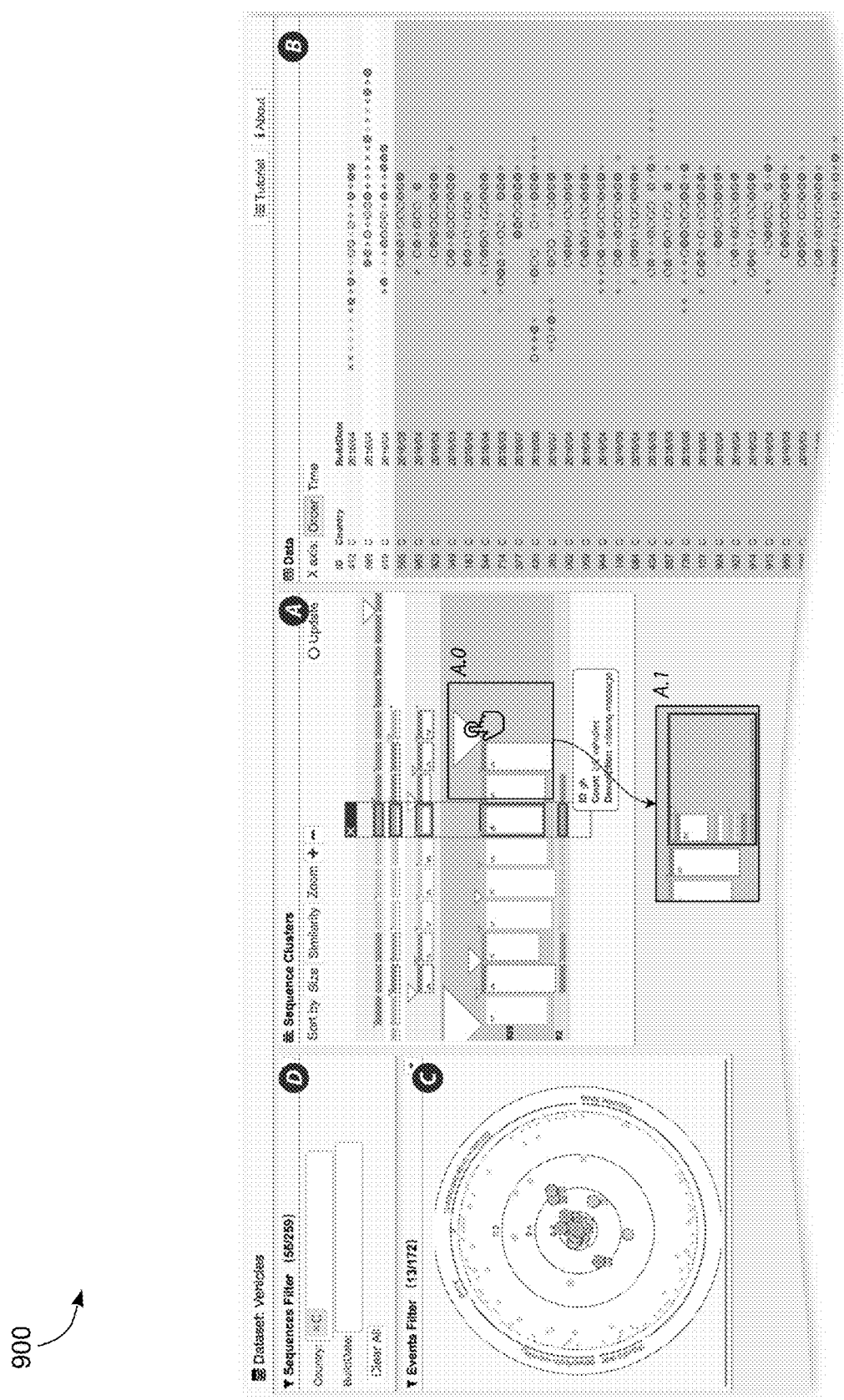
FIG. 9 is an example of a graphical user interface that displays the summarized event sequences and provides interactive elements to update the display of the summarized event sequences.

Referring again to FIG. 2, during the process 200 the system 100 also enables user interactions to update the graphical display of summarized sequence data and the original input event sequences via the input device 150 (block 236). FIG. 9 depicts a user interface 900 that includes the graphical depiction of the summarized event sequence data (A, A.0, and A.1) along with a detailed graphical depiction of a subset of the original sequences B, an input interface D that enables a user to provide criteria for filtering events, aligning the display of patterns and event sequences based on a selected event or time range, sorting the display of patterns based on similarity between the patterns, and a graphical display of the filtered summarized events C. The user interface 900 is one embodiment that the system 100 uses to present graphical depictions of the summarized event sequences and to provide an interface for user interactions.

One example of a supported interaction includes aligning the view of the patterns in the summarized event sequences and the original event sequences at a selected event. By default, the event sequences in summary view and the detail view are aligned at the first event. Users can select one event in the summary view and both views will be aligned to the selected event through animated transition. Displays A and B in the user interface 900 of FIG. 9 show an example where the events are aligned at the event labeled 'gh'. The system 100 receives a selection of the event type 'gh' using the input device 150 and generates the graphical depiction of the patterns in the summarized event sequence aligned to the selected event type 'gh'. The alignment provides a clear graphical depiction of the events in different patterns that occur before and after the aligned event to enable analysis of the differences in event sequences between different patterns in the graphical depiction of the summarized event sequences.

Another interaction enables detail on demand. Besides expanding the addition correction triangles and deletion correction rectangles to display more detailed correction data as shown in FIG. 8, the detailed view is linked with the summary view and the users can check the original sequences mapped to a particular pattern. For example, in FIG. 9 the system 100 can receive an input request with the input device 150 to select a pattern in the summarized event sequence display A and present a more detailed view of some or all of the sequences that are mapped to the pattern in the detailed view B to provide detailed views of selected sequences.

Another interaction enables filtering of data. Besides filtering events, the system 100 can also filter the event sequences through their attribute values as shown in displays C and D of FIG. 9. The event filter (FIG. 9 (C)) is be updated accordingly to reflect the co-occurrences of events in the filtered sequences. In FIG. 9, one form of a filtered visualization of the event sequence data depicts the co-occurrence of all the events that are included in sequences that also include a focus event type that the user specifies with the input device 150. The co-occurrence is measured by Jaccard Index and is encoded as the radial distances to the focus event at the center of the display. The system 100 can receive additional inputs to update the filtered display in FIG. 9 (C) to change the focus in an interactive manner. The sizes of the circles in the radial display (C) of FIG. 9 represent how frequently the co-occurring events occur overall. The events are arranged around the circle based on their event type. In the filtered visualization, events that frequently co-occur with the focus event type are close to the center of the radial display. The system 100 can provide a lasso selection tool or other form of selection tool to select a set of highly relevant events and focus on the sequential patterns containing those events. The graphical depiction of the filtered data is useful for finding events that frequently co-occur with the selected filter event type, which can be useful in, for example, identifying events that frequently co-occur with an event type associated with a fault.

Figure 10:
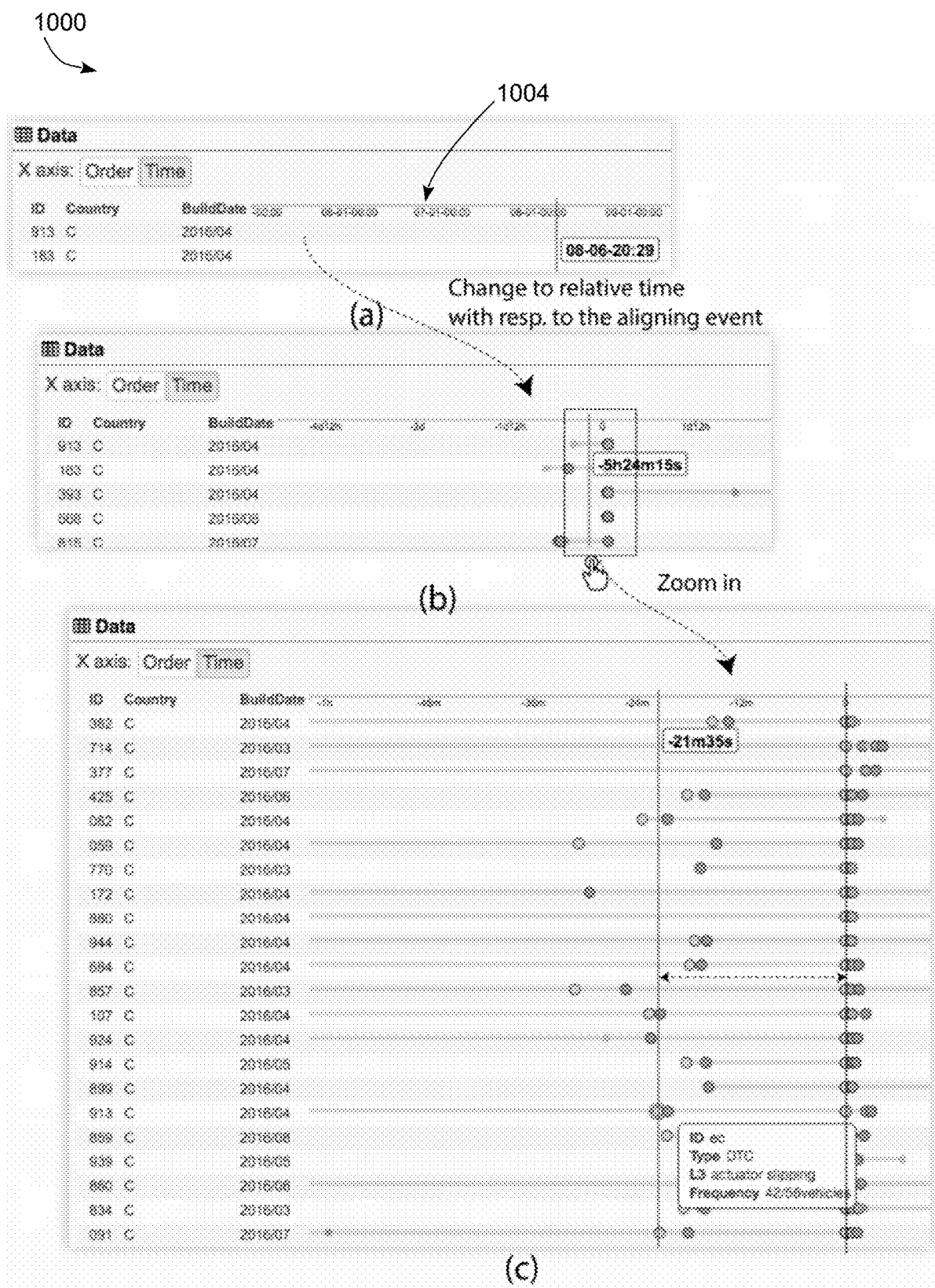
FIG. 10 is a depiction of summarized event sequences arranged on a time line with varying time scales.

Another interaction enables changes to the temporal 'X' axis of the event sequences to view the events that occur in a specific time ranges in more detail, although of course an alternative embodiment can display the temporal axes vertically or at an angle instead of horizontally. The horizontal scale in the detailed view can be changed to show accurate temporal information instead of only sequential orders. FIG. 10 shows an example graphical depiction 1000 of adjustments to the scale of a time axis. In FIG. 10, the user interface (a) presents a timeline 1004 that receives an input event to select a particular time to use for alignment of the event sequences. The system 100 generates a graphical display (b) of event sequences that occur during the selected time and optionally enables a "zoomed" view (c) that depicts a shorter time range (e.g. a 20 minute time range in FIG. 10) around the selected time. The display of FIG. 10 can provide improved visualization of the causal relationships between events that occur within the selected time range both within a single pattern and between larger groups of patterns.

Figure 11:
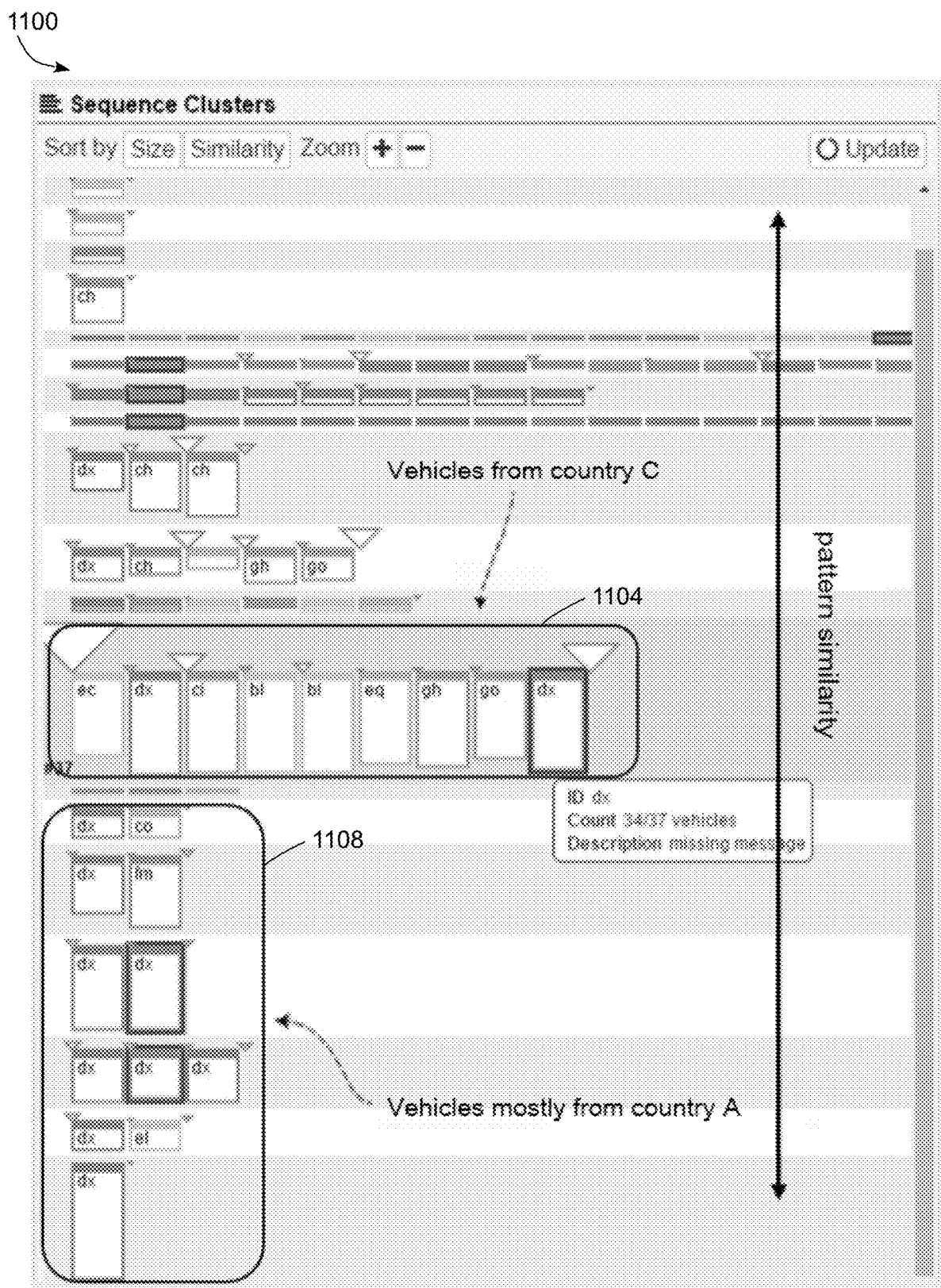
FIG. 11 is a diagram depicting summarized event sequences that are sorted by pattern similarity.

Another interaction enables the reordering of patterns in the summarized event sequence view based on user criteria. In the summary view, the system 100 provides sorting the sequential patterns by 1) the number of sequences in the corresponding cluster and 2) the similarity between the patterns measured through the editing distance. To reorder by similarity, the processor 108 first performs a hierarchical clustering of the patterns, which occurs after the process 200 performs the MinDL or MinDL+LSH operations to produce the clusters. The hierarchical clustering process produces groups of similar patterns. The processor 108 subsequently sorts the patterns within each group by the order of leaves in a dendrogram, which is a diagram of a tree structure, which the hierarchical clustering process generates. FIG. 11 shows a graphical depiction of summarized event sequences that are sorted into groups by the similarities between the patterns in different clusters that the process 200 generates as described above. In some embodiments, the user provides an input criterion to use for sorting the clusters, such as selecting clusters that pertain to vehicles from country C in the illustrative embodiment of FIG. 11. The system 100 sorts the display of patterns to separate the pattern group 1104 for vehicles from country C from another group of patterns 1108 that are associated with vehicles from a different country (country A in the patterns 1108) to sort the different groups of patterns based on the similarity between the patterns.

One example of a computer graphics system that employs the embodiments described above implements functions that produce summarized graphical depictions of the event sequence data and further enable a user to review a small subset of the records in more detail, compile descriptive information about the dataset or a subgroup of records and events (e.g. through aggregated views), identify a set of records of interest using filtering criteria, and study antecedents or sequalae of an event of interest. In particular, one embodiment of the system 100 as depicted in the interface 900 of FIG. 9 starts from a summarized graphical depiction of the sequential patterns in display A, and provides an interface to select a subset for further investigation in A.0 and A.1 along with the detailed sequence display B. The system also enables filtering of sequences and patterns by their attribute values or filter events by their co-occurrences. The system also supports interactive alignment on a selected event to study cause and effect relationships between events.

Non-limiting examples of usage scenarios for the embodiments described herein include analysis of sequences of events that occur during a fault analysis to assist in the review and analysis of faults that occur in a product. One example of a complex product that often encounters a sequence of events that occur prior to and after a fault is a motor vehicle. The system 100 generates graphical depictions of the summarized event sequences for different events, such as a temporal sequence of OBD-II diagnostic events that are recorded in the on-board electronic control unit of a vehicle, for a large set of vehicles that encounter a fault. The system 100 enables both summarized analysis of event sequences that occur for a large number of vehicles corresponding to patterns that the system 100 generates for one or more clusters of similar event sequences. Additionally, the system 100 enables analysis of the event sequences in individual vehicles that may deviate from one of the patterns, and enables a display of filtered, sorted, and aligned patterns to enable analysis of the underlying causes of faults to help improve the repair process and preventive maintenance of the motor vehicles by identifying common sequences of events that precede the occurrence of a fault.

Another non-limiting example of a usage scenario of the embodiments described herein is in the analysis of log file information that is generated during the execution of various software applications including, for example, desktop or web software applications as part of a process to analyze the usage patterns of the software to improve the design of user interfaces in the software programs. In this usage scenario, each event corresponds to a keyboard, mouse, or other input that the user provides while using the program, and a series of these inputs provides an event sequence for additional analysis. The system 100 generates the graphical depiction of the summarized event sequences that enables an analyst to select individual patterns for a detailed view of sequences that correspond to each pattern as depicted in the detailed view of event sequences B in FIG. 9. The system 100 also provides an alignment of the patterns based on an event, such as an error event, that enable analysis of the typical sequence of events that precedes the error event to enable improvements to the user interface of a software application that can reduce the occurrences of the error event.

The embodiments described herein provide improvements to the operation of computer systems that generate graphical summarizations of sequences of data. As described in the embodiments herein, these improvements can be implemented using software that is stored in a non-transitory memory and executed by a computer, hardware, or a combination of software and hardware. A non-limiting example of an improvement to the operation of a computer system that is described herein is an automated process to generate a two-part graphical depiction of summarized event sequences including both a set of sequential patterns that summarize the original event sequences and a set of corrections for sequences that do not exactly match the patterns. In combination with the MinDL optimization process, the patterns can be used to generate graphical depictions of complex sequence event data while reducing visual clutter. Another non-limiting example of an improvement is a computationally efficient process to identify an optimal set of patterns to summarize the data based on the MinDL optimization process. Another non-liming example of an improvement is a visual analytics system that supports level-of-detail exploration of event sequence data.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for generating a graphical depiction of summarized event sequences, the method comprising:
   receiving, with a processor, a plurality of event sequences, each event sequence in the plurality of event sequences including a plurality of events;
   generating, with the processor, a plurality of clusters using a minimum description length (MDL) optimization process, each cluster in the plurality of clusters including a set of at least two event sequences in the plurality of event sequences that maps to a pattern in each cluster, the pattern in each cluster having a plurality of events included in at least one event sequence in the set of at least two event sequences in the cluster;
   identifying, with the processor, a correction corresponding to an edit between the pattern in the first cluster and an event sequence in the set of at least two event sequences in the first cluster; and
   generating, with the processor and a display output device, a graphical depiction of a first cluster in the plurality of clusters, the graphical depiction including (i) a graphical depiction of a first plurality of events in the pattern of the first cluster and (ii) a graphical indicator of the correction for the pattern.

2. The method of claim 1, the generating of the graphical depiction further comprising:
   generating, with the processor and the display output device, the graphical depiction of at least two clusters in the plurality of clusters, the graphical depiction including a graphical depiction for each of the plurality of events included in each pattern of the at least two clusters of clusters.

3. The method of claim 1 further comprising:
   identifying, with the processor, the correction corresponding to an addition edit between the pattern in the first cluster and the event sequence in the set of at least two event sequences in the first cluster; and
   generating, with the processor, the graphical depiction further comprising a graphical indicator of an addition correction for the pattern.

4. The method of claim 1 further comprising:
   identifying, with the processor, the correction corresponding to a deletion edit between the pattern in the first cluster and the event sequence in the set of at least two event sequences in the first cluster; and
   generating, with the processor, the graphical depiction further comprising a graphical indicator of a deletion correction for the pattern.

5. The method of claim 1 wherein the graphical indicator provides a lossy correction for the pattern.

6. The method of claim 1 further comprising:
   receiving, with an input device, a selection of the graphical indicator of the correction; and
   generating, with the processor, the graphical depiction including the plurality of events in the event sequence in the set of at least two event sequences in the first cluster that corresponds to the edit to provide a detailed graphical depiction of the correction.

7. The method of claim 1 further comprising:
   receiving, with an input device, a selection of one event having a first event type in the first plurality of events in the pattern of the first cluster; and
   generating, with the processor, the graphical depiction including a second plurality of events in a pattern of a second cluster in the plurality of clusters, second plurality of events including an event having the first event type that is aligned with the one event in the first plurality of events in the pattern of the first cluster in the graphical depiction.

8. The method of claim 1 further comprising:
   receiving, with an input device, a selection of one event having a first event type in the first plurality of events in the pattern of the first cluster; and
   generating, with the processor, the graphical depiction including a filtered display of a plurality of events in at least one other cluster in the plurality of clusters that co-occur with the first event type of the one event.

9. A system for generation of graphical depictions of summarized event sequences, the system comprising:
   a display output device;
   a memory configured to store:
     program instructions; and
     a plurality of event sequences, each event sequence in the plurality of event sequences including a plurality of events; and
   a processor operatively connected to the display output device and the memory, the processor being configured to execute the program instructions to:
     generate a plurality of clusters using a minimum description length (MDL) optimization process, each cluster in the plurality of clusters including a set of at least two event sequences in the plurality of event sequences that maps to a pattern in each cluster, the pattern in each cluster having a plurality of events included in at least one event sequence in the set of at least two event sequences in the cluster;
     receive a selection of one event having a first event type in the first plurality of events in the pattern of the first cluster with the input device; and
     generate a graphical depiction of a first cluster in the plurality of clusters with the display output device, the graphical depiction including a graphical depiction of (i) a first plurality of events in the pattern of the first cluster and (ii) a second plurality of events in a pattern of a second cluster in the plurality of clusters, second plurality of events including an event having the first event type that is aligned with the one event in the first plurality of events in the pattern of the first cluster in the graphical depiction.

10. The system of claim 9, the processor being further configured to:
    generate the graphical depiction of at least two clusters in the plurality of clusters with the display output device, the graphical depiction including a graphical depiction for each of the plurality of events included in each pattern of the at least two clusters.

11. The system of claim 9, the processor being further configured to:
identify a correction corresponding to an edit between the pattern in the first cluster and an event sequence in the set of at least two event sequences in the first cluster; and
generate the graphical depiction further comprising a graphical indicator of the correction for the pattern.

12. The system of claim 11, the processor being further configured to:
identify the correction corresponding to an addition edit between the pattern in the first cluster and the event sequence in the set of at least two event sequences in the first cluster; and
generate the graphical depiction further comprising a graphical indicator of an addition correction for the pattern.

13. The system of claim 11, the processor being further configured to:
identify the correction corresponding to a deletion edit between the pattern in the first cluster and the event sequence in the set of at least two event sequences in the first cluster; and
generate the graphical depiction further comprising a graphical indicator of a deletion correction for the pattern.

14. The system of claim 11 wherein the graphical indicator provides a lossy correction for the pattern.

15. The system of claim 11, the processor being further configured to:
receive a selection of the graphical indicator of the correction with the input device with the input device; and
generate the graphical depiction including the plurality of events in the event sequence in the set of at least two event sequences in the first cluster that corresponds to the edit to provide a detailed graphical depiction of the correction.

16. The system of claim 9, the processor being further configured to:
receive a selection of one event having a first event type in the first plurality of events in the pattern of the first cluster with the input device; and
generating, with the processor, the graphical depiction including a filtered display of a plurality of events in at least one other cluster in the plurality of clusters that co-occur with the first event type of the one event.

17. The system of claim 9, the processor being further configured to:
transmit the graphical depiction of the first cluster in the plurality of clusters to a remote computing device that includes the display output device.

18. A system for generation of graphical depictions of summarized event sequences, the system comprising:
a display output device;
a memory configured to store:
program instructions; and
a plurality of event sequences, each event sequence in the plurality of event sequences including a plurality of events; and
a processor operatively connected to the display output device and the memory, the processor being configured to execute the program instructions to:
generate a plurality of clusters using a minimum description length (MDL) optimization process, each cluster in the plurality of clusters including a set of at least two event sequences in the plurality of event sequences that maps to a pattern in each cluster, the pattern in each cluster having a plurality of events included in at least one event sequence in the set of at least two event sequences in the cluster;
identify a correction corresponding to an edit between the pattern in the first cluster and an event sequence in the set of at least two event sequences in the first cluster; and
generate a graphical depiction of a first cluster in the plurality of clusters with the display output device, the graphical depiction including (i) a graphical depiction of a first plurality of events in the pattern of the first cluster and (ii) a graphical indicator of the correction for the pattern.

* * * * *